(12) United States Patent
Ueshima

(10) Patent No.: US 8,851,619 B2
(45) Date of Patent: Oct. 7, 2014

(54) APPARATUS FOR OPTIMIZING NON-EJECTION CORRECTION PARAMETER OF INK-JET HEAD, AND INK-JET PRINTER

(71) Applicant: FUJIFILM Corporation, Tokyo (JP)

(72) Inventor: Masashi Ueshima, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/024,445

(22) Filed: Sep. 11, 2013

(65) Prior Publication Data

US 2014/0071191 A1 Mar. 13, 2014

(30) Foreign Application Priority Data

Sep. 12, 2012 (JP) .................. 2012-200543

(51) Int. Cl.
*B41J 29/393* (2006.01)
*B41J 2/21* (2006.01)
*B41J 2/07* (2006.01)
*H04N 1/60* (2006.01)

(52) U.S. Cl.
CPC *B41J 2/07* (2013.01); *B41J 2/2146* (2013.01); *B41J 2/2132* (2013.01); *B41J 2029/3935* (2013.01); *H04N 1/6033* (2013.01); *B41J 2/2139* (2013.01)
USPC .......................................................... 347/19

(58) Field of Classification Search
USPC .......................................................... 347/19
See application file for complete search history.

(56) References Cited

U.S. PATENT DOCUMENTS

| 2009/0262158 A1 | 10/2009 | Sasayama |
| 2010/0238220 A1 | 9/2010 | Yeh et al. |
| 2011/0084996 A1 | 4/2011 | Hirato et al. |
| 2012/0050377 A1 | 3/2012 | Ueshima |

FOREIGN PATENT DOCUMENTS

| EP | 2308683 A1 | 4/2011 |
| EP | 2422984 A1 | 2/2012 |
| JP | 2012-071474 A | 4/2012 |

OTHER PUBLICATIONS

The extended European search report issued on Jan. 8, 2014, which corresponds to European Patent Application No. 13183895.5 and is related to U.S. Appl. No. 14/024,445.

*Primary Examiner* — Lamson Nguyen
(74) *Attorney, Agent, or Firm* — Studebaker & Brackett PC

(57) ABSTRACT

The present invention efficiently optimizes a non-ejection correction parameter for each nozzle. The non-ejection correction parameter for each nozzle is optimized by repeatedly executing the operations of generating test chart data based on a non-ejection correction parameter for each of a plurality of nozzles provided on an ink-jet head; acquiring read data of a test chart recorded on a recording medium by ejecting ink from the plurality of nozzles based on the test chart data while relatively moving the ink-jet head and the recording medium; evaluating a correction intensity of the non-ejection correction parameter for each of the nozzles based on the acquired read data; and updating the non-ejection correction parameter for each of the nozzles based on a single variable root-finding algorithm using iteration method from the evaluated correction intensity.

9 Claims, 12 Drawing Sheets

APPARATUS FOR OPTIMIZING NON-EJECTION CORRECTION PARAMETER OF INK-JET HEAD, AND INK-JET PRINTER

BACKGROUND OF THE INVENTION

1. Field of the Invention

The present invention relates to an apparatus and method for optimizing a non-ejection correction parameter of an ink-jet head, an image recording apparatus and method, a test chart, and an ink-jet printer.

2. Description of the Related Art

When an ink-jet head is used for drawing in an ink-jet recording apparatus for a long period of time, some nozzles come into a non-ejection state due to clogging or breakdown. Particularly in a case of drawing in a single-pass method, the position of a non-ejection nozzle appears as a white stripe, and thus needs to be corrected.

Japanese Patent Application Laid-Open No. 2012-71474 discloses a technique for determining a correction parameter for non-ejection correction that varies with a difference in a landing interference pattern based on an arrangement form of a plurality of nozzles on a head, and correspondence information indicating a correspondence relation between a plurality of types of landing interference patterns and respective nozzles corresponding to a landing interference causing factor including a landing order of ejected droplets defined from a relative movement direction between the head and a recording medium.

In Japanese Patent Application Laid-Open No. 2012-71474, correction parameters for non-ejection correction are referred to based on the positional information of the non-ejection nozzle, and a corrective calculation of input image data using the corresponding correction parameter is performed to generate image data modified so as to compensate for the output of a non-ejection nozzle by use of nozzles other than the non-ejection nozzle.

Accordingly, the non-ejection correction parameter can be obtained in consideration of the influence of landing interference of droplets ejected from the other nozzles around the non-ejection nozzle on the recording medium. Correcting performance is further improved by performing non-ejection correction by use of the parameter.

In Japanese Patent Application Laid-Open No. 2012-71474, it is assumed that "optimum non-ejection correction parameters for the nozzles included in the same group can be considered to be equal to each other". However, the assumption does not hold true with respect to all the nozzles in actual cases. Variation in the optimum value of the non-ejection correction parameter between respective nozzles is increased depending on, for example, variation in a landing position error of ink ejected from each nozzle between respective nozzles or variation in the amount of ejected ink. If the same parameter is applied to the nozzle group having variation in the optimum value as described above, stripe unevenness is caused due to excess correction or deficient correction.

To solve the problem in Japanese Patent Application Laid-Open No. 2012-71474, individual non-ejection correction parameters for all the nozzles need to be optimized. However, there are a large number of nozzles (thousands to ten thousands) in a single-pass system. A technique for optimizing all the parameters thus needs to be an efficient optimizing method. As the efficiency of the optimizing method is lower, a longer processing time or a larger number of test chart sheets is required.

SUMMARY OF THE INVENTION

The present invention has been made in view of such circumstances, and an object thereof is to provide an apparatus and method for optimizing a non-ejection correction parameter of an ink-jet head which enable efficient optimization of the non-ejection correction parameter for each nozzle, an image recording apparatus and method, and a test chart.

To achieve the above object, an apparatus for optimizing a non-ejection correction parameter of an ink-jet head according to one aspect includes: a test chart data generating device which generates test chart data based on a non-ejection correction parameter for each of a plurality of nozzles provided on the ink-jet head; a read data acquiring device which acquires read data of a test chart recorded on a recording medium by ejecting ink from the plurality of nozzles based on the test chart data while relatively moving the ink-jet head and the recording medium; an evaluating device which evaluates a correction intensity of the non-ejection correction parameter for each of the nozzles based on the acquired read data; a parameter updating device which updates the non-ejection correction parameter for each of the nozzles based on a single variable root-finding algorithm using iteration method from the evaluated correction intensity; a controlling device which optimizes the non-ejection correction parameter for each of the nozzles by repeatedly executing the operations of the test chart data generating device, the read data acquiring device, the evaluating device, and the parameter updating device; and an outputting device which outputs the optimized non-ejection correction parameter for each of the nozzles.

In accordance with the present aspect, the non-ejection correction parameter for each of the nozzles is optimized by repeatedly executing the operations of generating the test chart data based on the non-ejection correction parameter for each of the plurality of nozzles provided on the ink-jet head; acquiring the read data of the test chart recorded on the recording medium by ejecting ink from the plurality of nozzles based on the test chart data while relatively moving the ink-jet head and the recording medium; evaluating the correction intensity of the non-ejection correction parameter for each of the nozzles based on the acquired read data; and updating the non-ejection correction parameter for each of the nozzles based on the single variable root-finding algorithm using iteration method from the evaluated correction intensity, so that the non-ejection correction parameter for each of the nozzles can be efficiently optimized. Accordingly, the non-ejection correction parameters for all the nozzles can be calculated within a shorter processing time and with a smaller number of test chart sheets. The performance of non-ejection correction is also improved.

Preferably, Brent's method may be employed as the single variable root-finding algorithm using iteration method. Accordingly, convergence stability and convergence efficiency can be improved.

The controlling device (one example of a determining device) may repeatedly execute the operations up to a predetermined number of times. The apparatus for optimizing a non-ejection correction parameter of an ink-jet head may further include a determining device which determines whether or not the evaluated correction intensity is smaller than a predetermined value, wherein the operations are repeatedly executed until the evaluated correction intensity is determined to be smaller than the predetermined value. Accordingly, the non-ejection correction parameter can be appropriately optimized.

Preferably, the test chart may have a simulated non-ejection region formed by a first nozzle, a non-ejection correction region formed by second nozzles on both sides of the first nozzle, and a constant-density region formed by a third nozzle other than the first nozzle and the second nozzles, a plurality of stages in each of which the simulated non-ejection regions are arranged at a predetermined interval in a first direction being arranged in a second direction perpendicular to the first direction, and the simulated non-ejection regions in the plurality of stages being arranged at different positions from each other with respect to the first direction, and the test chart data may be data which does not cause the first nozzle to eject ink, causes the third nozzle to eject ink at an instruction value of a predetermined density, and causes the second nozzles to eject ink at an instruction value obtained by correcting the instruction value of the predetermined density based on the non-ejection correction parameter of the first nozzle adjacent thereto. Accordingly, the correction intensity of the non-ejection correction parameter can be appropriately evaluated.

The test chart may further have a reference region stage obtained by causing all the nozzles to eject ink at the instruction value of the predetermined density. Accordingly, the correction intensity of the non-ejection correction parameter can be appropriately evaluated.

Preferably, the correction intensity may be a difference between a density value of the read data around the simulated non-ejection region and a density value of the predetermined density. Accordingly, the correction intensity of the non-ejection correction parameter can be appropriately evaluated.

Preferably, the non-ejection correction parameter for each of the nozzles may be provided with respect to each density, and the controlling device may optimize the non-ejection correction parameter at the instruction value of the predetermined density. Accordingly, the non-ejection correction parameter can be appropriately optimized with respect to each density.

The non-ejection correction parameter for each of the nozzles may be composed of a plurality of parameters expressed with a common variable, and the parameter updating device may update the common variable. Accordingly, the non-ejection correction parameter having the plurality of parameters expressed with the common variable can be optimized.

To achieve the above object, an ink-jet printer according to one aspect includes: an ink-jet head which is provided with a plurality of nozzles for ejecting ink; and an apparatus for optimizing a non-ejection correction parameter of the ink-jet head, wherein the apparatus for optimizing a non-ejection correction parameter is the apparatus defined in any one of the above aspects.

To achieve the above object, an image recording apparatus according to one aspect includes: an ink-jet head which is provided with a plurality of nozzles for ejecting ink; a moving device which relatively moves the ink-jet head and a recording medium; a recording controlling device which performs recording on the recording medium by ejecting ink from the plurality of nozzles while relatively moving the ink-jet head and the recording medium; a test chart data generating device which generates test chart data based on a non-ejection correction parameter for each of the plurality of nozzles provided on the ink-jet head; a test chart recording device which records a test chart on the recording medium based on the test chart data; a read data acquiring device which acquires read data of the test chart recorded on the recording medium; an evaluating device which evaluates a correction intensity of the non-ejection correction parameter for each of the nozzles based on the acquired read data; a parameter updating device which updates the non-ejection correction parameter for each of the nozzles based on a single variable root-finding algorithm using iteration method from the evaluated correction intensity; a controlling device which optimizes the non-ejection correction parameter for each of the nozzles by repeatedly executing the operations of the test chart data generating device, the read data acquiring device, the evaluating device, and the parameter updating device; an outputting device which outputs the optimized non-ejection correction parameter for each of the nozzles; a non-ejection nozzle identifying device which identifies a non-ejection nozzle from the plurality of nozzles; a data acquiring device which acquires image data recorded on the recording medium; and a non-ejection correcting device which performs non-ejection correction of the identified non-ejection nozzle with respect to the acquired image data, the non-ejection correcting device performing the non-ejection correction based on the non-ejection correction parameter of the non-ejection nozzle.

In accordance with the present aspect, the non-ejection correction parameter for each of the nozzles is optimized by repeatedly executing the operations of generating the test chart data based on the non-ejection correction parameter for each of the plurality of nozzles provided on the ink-jet head; acquiring the read data of the test chart recorded on the recording medium by ejecting ink from the plurality of nozzles based on the test chart data while relatively moving the ink-jet head and the recording medium; evaluating the correction intensity of the non-ejection correction parameter for each of the nozzles based on the acquired read data; and updating the non-ejection correction parameter for each of the nozzles based on the single variable root-finding algorithm using iteration method from the evaluated correction intensity, so that the non-ejection correction parameter for each of the nozzles can be efficiently optimized. Also, the non-ejection nozzle is identified from the plurality of nozzles, and when the non-ejection correction of the non-ejection nozzle identified by acquiring the image data recorded on the recording medium is performed, the non-ejection correction is performed based on the optimized non-ejection correction parameter. Thus, the non-ejection correction can be optimally performed with respect to all the nozzles.

The image recording apparatus may further include an image reading device which reads the test chart recorded on the recording medium based on the test chart data, and generates the read data. Accordingly, recording to reading of the test chart can be automatically performed.

The image recording apparatus may further include a non-ejection correction parameter storing device which stores the optimized non-ejection correction parameter for each of the nozzles. Accordingly, the non-ejection correction can be always appropriately performed.

To achieve the above object, a method for optimizing a non-ejection correction parameter of an ink-jet head according to one aspect includes: a test chart data generating step of generating test chart data based on a non-ejection correction parameter for each of a plurality of nozzles provided on the ink-jet head; a read data acquiring step of acquiring read data of a test chart recorded on a recording medium by ejecting ink from the plurality of nozzles based on the test chart data while relatively moving the ink-jet head and the recording medium; an evaluating step of evaluating a correction intensity of the non-ejection correction parameter for each of the nozzles based on the acquired read data; a parameter updating step of updating the non-ejection correction parameter for each of the nozzles based on a single variable root-finding algorithm using iteration method from the evaluated correction intensity; a controlling step of optimizing the non-ejection correction parameter for each of the nozzles by repeatedly executing the operations of the test chart data generating step, the read data acquiring step, the evaluating step, and the parameter updating step; and an outputting step of outputting the optimized non-ejection correction parameter for each of the nozzles.

In accordance with the present aspect, the non-ejection correction parameter for each of the nozzles is optimized by repeatedly executing the operations of generating the test chart data based on the non-ejection correction parameter for each of the plurality of nozzles provided on the ink-jet head; acquiring the read data of the test chart recorded on the recording medium by ejecting ink from the plurality of nozzles based on the test chart data while relatively moving the ink-jet head and the recording medium; evaluating the correction intensity of the non-ejection correction parameter for each of the nozzles based on the acquired read data; and updating the non-ejection correction parameter for each of the nozzles based on the single variable root-finding algorithm using iteration method from the evaluated correction intensity, so that the non-ejection correction parameter for each of the nozzles can be efficiently optimized. Accordingly, the non-ejection correction parameters for all the nozzles can be calculated within a shorter processing time and with a smaller number of test chart sheets. The performance of non-ejection correction is also improved.

Also, to achieve the above object, a program for optimizing a non-ejection correction parameter of an ink-jet head according to one aspect causes a computer to execute the respective steps of the method for optimizing a non-ejection correction parameter of an ink-jet head. The program which causes a computer to execute the respective steps of the method for optimizing a non-ejection correction parameter of an ink-jet head is also included in the present aspect.

To achieve the above object, an image recording method according to one aspect includes: a recording controlling step of performing recording on a recording medium by ejecting ink from a plurality of nozzles for ejecting ink provided on an ink-jet head while relatively moving the ink-jet head and the recording medium; a test chart data generating step of generating test chart data based on a non-ejection correction parameter for each of the plurality of nozzles provided on the ink-jet head; a test chart recording step of recording a test chart on the recording medium based on the test chart data; a read data acquiring step of acquiring read data of the test chart recorded on the recording medium; an evaluating step of evaluating a correction intensity of the non-ejection correction parameter for each of the nozzles based on the acquired read data; a parameter updating step of updating the non-ejection correction parameter for each of the nozzles based on a single variable root-finding algorithm using iteration method from the evaluated correction intensity; a controlling step of optimizing the non-ejection correction parameter for each of the nozzles by repeatedly executing the operations of the test chart data generating step, the read data acquiring step, the evaluating step, and the parameter updating step; an outputting step of outputting the optimized non-ejection correction parameter for each of the nozzles; a non-ejection nozzle identifying step of identifying a non-ejection nozzle from the plurality of nozzles; a data acquiring step of acquiring image data recorded on the recording medium; and a non-ejection correcting step of performing non-ejection correction of the identified non-ejection nozzle with respect to the acquired image data, and in the non-ejection correcting step, the non-ejection correction being performed based on the non-ejection correction parameter of the non-ejection nozzle.

In accordance with the present aspect, the non-ejection correction parameter for each of the nozzles is optimized by repeatedly executing the operations of generating the test chart data based on the non-ejection correction parameter for each of the plurality of nozzles provided on the ink-jet head; acquiring the read data of the test chart recorded on the recording medium by ejecting ink from the plurality of nozzles based on the test chart data while relatively moving the ink-jet head and the recording medium; evaluating the correction intensity of the non-ejection correction parameter for each of the nozzles based on the acquired read data; and updating the non-ejection correction parameter for each of the nozzles based on the single variable root-finding algorithm using iteration method from the evaluated correction intensity, so that the non-ejection correction parameter for each of the nozzles can be efficiently optimized. Also, the non-ejection nozzle is identified from the plurality of nozzles, and when the non-ejection correction of the non-ejection nozzle identified by acquiring the image data recorded on the recording medium is performed, the non-ejection correction is performed based on the optimized non-ejection correction parameter. Thus, the non-ejection correction can be optimally performed with respect to all the nozzles.

To achieve the above object, a test chart according to one aspect is a test chart for evaluating a non-ejection correction parameter for each of a plurality of nozzles provided on an ink-jet head, and has a simulated non-ejection region formed by a first nozzle, a non-ejection correction region formed by second nozzles on both sides of the first nozzle, and a constant-density region formed by a third nozzle other than the first nozzle and the second nozzles, and a plurality of stages in each of which the simulated non-ejection regions are arranged at a predetermined interval in a first direction are arranged in a second direction perpendicular to the first direction, and the simulated non-ejection regions in the plurality of stages are arranged at different positions from each other with respect to the first direction, no ink is ejected in the simulated non-ejection region, ink is ejected from the third nozzle at an instruction value of a predetermined density in the constant-density region, and ink is ejected from the second nozzles at an instruction value obtained by correcting the instruction value of the predetermined density based on the non-ejection correction parameter of the first nozzle adjacent thereto in the non-ejection correction region.

In accordance with the present aspect, the non-ejection correction parameter for each of the plurality of nozzles provided on the ink-jet head can be appropriately evaluated.

In accordance with the present invention, the non-ejection correction parameter for each of the nozzles can be efficiently optimized. Consequently, the non-ejection correction parameters for all the nozzles can be calculated within a shorter processing time and with a smaller number of test chart sheets, and the non-ejection correction can be appropriately performed with respect to all the nozzles by using the non-ejection correction parameters.

DETAILED DESCRIPTION OF THE PREFERRED EMBODIMENTS

In the following, preferred embodiments of the present invention will be described in detail based on the accompanying drawings.

[Outline of an Ink-Jet Recording Apparatus]

Figure 1:
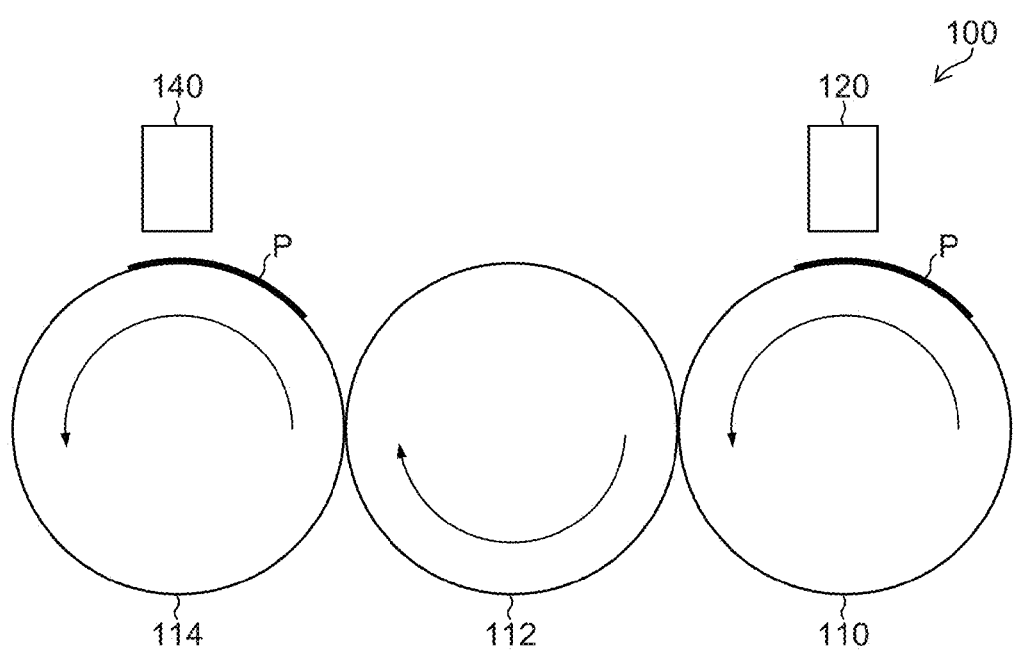
FIG. 1 is a side schematic view illustrating an ink-jet recording apparatus.

FIG. 1 is a side schematic view illustrating an ink-jet recording apparatus according to a present embodiment. An ink-jet recording apparatus 100 is a single-pass line printer which forms an image on a recording surface of a paper P (corresponding to a recording medium). The ink-jet recording apparatus 100 includes conveying drums 110, 112, and 114, a line head 120, and an in-line sensor 140 and the like.

A plurality of suction holes (not shown) are formed in a predetermined pattern in conveyance surfaces of the conveying drums 110, 112, and 114. The paper P wound around peripheral surfaces of the conveying drums 110, 112, and 114 is conveyed while being suctioned through the suction holes to be adhesively held on the peripheral surfaces of the conveying drums 110, 112, and 114.

A plurality of nozzles are formed on a surface of the line head 120 facing the conveying drum 110 over the entire width of the paper P. The line head 120 is controlled by a control unit 150 (not shown in FIG. 1) to eject ink from the respective nozzles, and thereby form an image on the recording surface of the paper P conveyed by the conveying drum 110. As described above, an image is formed over the entire recording surface of the paper P through a single conveyance (a single pass) by the conveying drum 110.

The paper P where the image is formed on the recording surface by the line head 120 is transferred to the conveying drum 112 from the conveying drum 110, and further transferred to the conveying drum 114 from the conveying drum 112.

The image formed on the recording surface of the paper P adhesively held on the conveying drum 114 is picked up by the in-line sensor 140 (one example of an image reading device).

The in-line sensor 140 is a device which reads the image formed on the paper P, and detects the density of the image, displacement of a dot landing position, or the like. A CCD line sensor or the like is employed as the in-line sensor 140.

Figure 2:
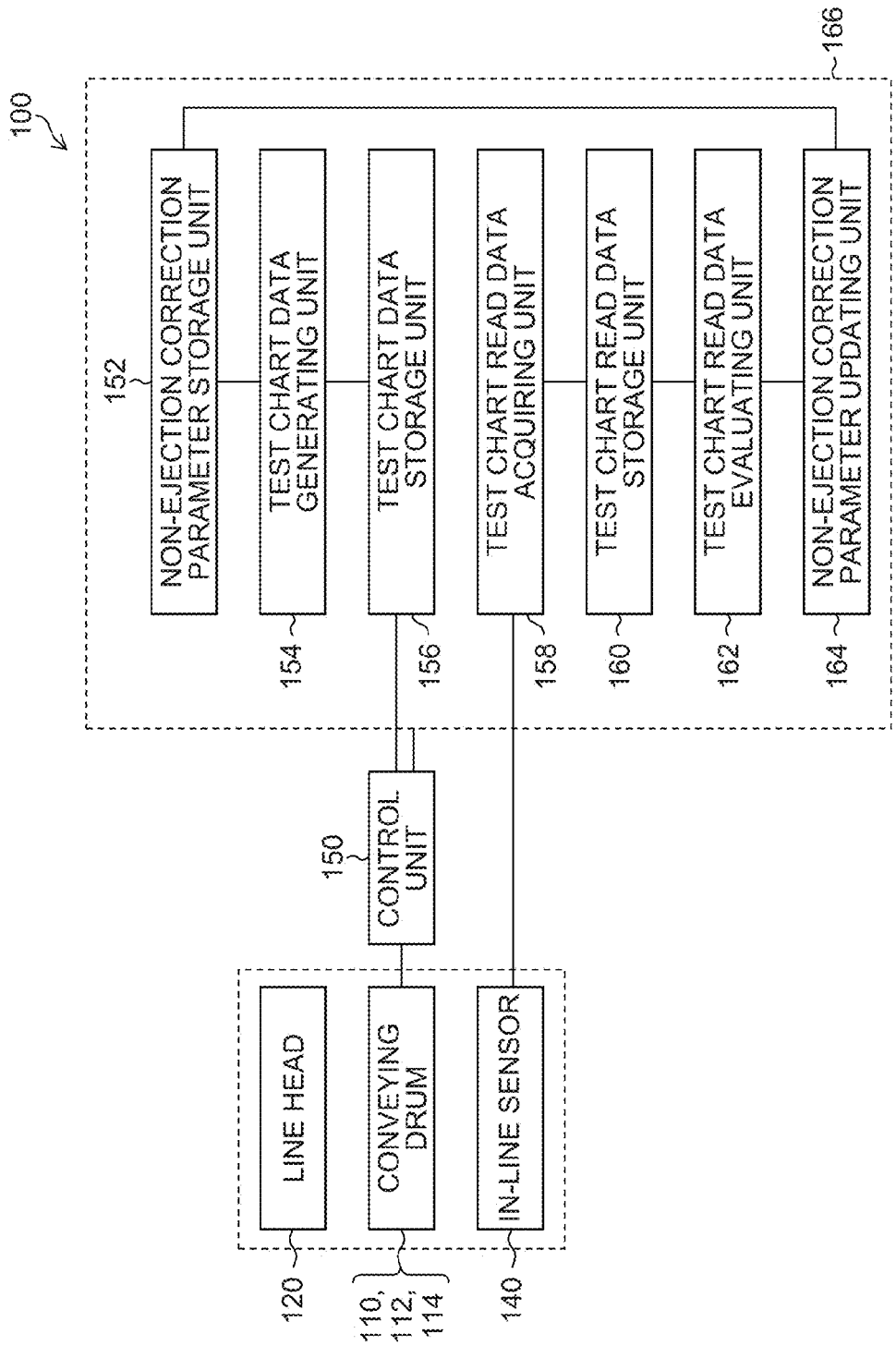
FIG. 2 is a block diagram illustrating the electric configuration of the ink-jet recording apparatus.

FIG. 2 is a block diagram illustrating the electric configuration of the ink-jet recording apparatus 100. The ink-jet recording apparatus 100 includes a non-ejection correction parameter optimizing unit 166 (one example of a non-ejection correction parameter optimizing unit) composed of a non-ejection correction parameter storage unit 152, a test chart data generating unit 154, a test chart data storage unit 156, a test chart read data storage unit 160, a test chart read data evaluating unit 162, a non-ejection correction parameter updating unit 164, or the like in addition to the conveying drums 110, 112, and 114, the line head 120, the in-line sensor 140, and the control unit 150 which controls these components.

The non-ejection correction parameter storage unit 152 (one example of an outputting device) stores a non-ejection correction parameter for each of all the nozzles of the line head 120. The test chart data generating unit 154 (one example of a test chart data generating device) generates test chart data for optimizing the non-ejection correction parameter based on the non-ejection correction parameter for each of the nozzles stored in the non-ejection correction parameter storage unit 152. The test chart data generated by the test chart data generating unit 154 is stored in the test chart data storage unit 156.

The control unit 150 (one example of a recording controlling device and a test chart recording device) controls the line head 120 based on the input test chart data, and records a test chart on the recording surface of the paper P conveyed by the conveying drum 110.

The paper P on which the test chart is recorded is conveyed to the conveying drums 112 and 114 from the conveying drum 110, and the in-line sensor 140 reads the test chart. The in-line sensor 140 reads the test chart recorded on the paper P, and generates test chart read data. The test chart read data read by the in-line sensor 140 is stored in the test chart read data storage unit 160.

The test chart read data evaluating unit 162 evaluates the test chart read data stored in the test chart read data storage unit 160, and calculates an evaluation value. The non-ejection correction parameter updating unit 164 updates the non-ejection correction parameter based on the evaluation value. The updated non-ejection correction parameter is stored in the non-ejection correction parameter storage unit 152.

[Basic Principle of Non-Ejection Correction]

Figure 3A:
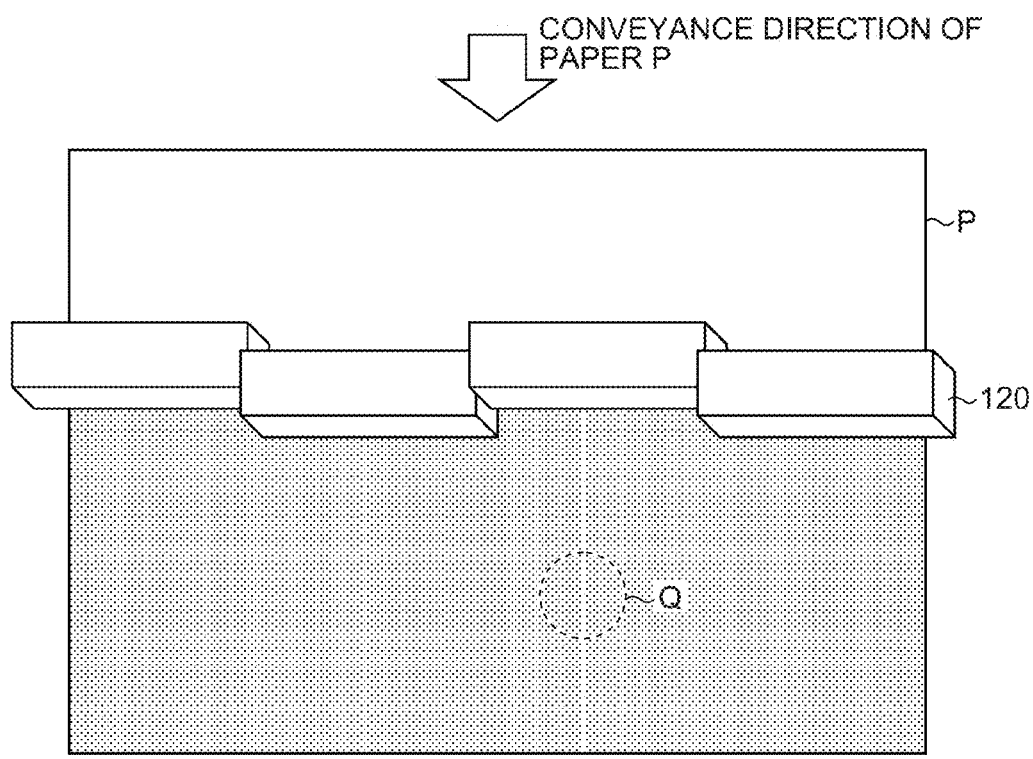
FIGS. 3A and 3B are views for explaining the basic principle of non-ejection correction.
Figure 3B:
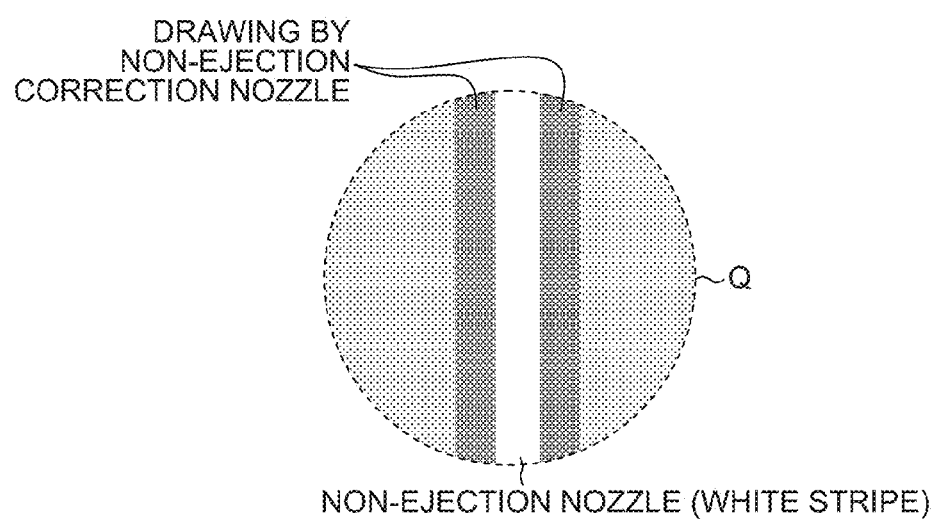

FIGS. 3A and 3B are views for explaining the basic principle of non-ejection correction. FIG. 3B is an enlarged view of Q portion in FIG. 3A.

The non-ejection correction is to reduce the influence of non-ejection by using a normal nozzle when a certain nozzle (called non-ejection nozzle below) cannot eject ink, or stops ejecting ink due to crooked flight of ink.

If there is a non-ejection nozzle in the line head 120, ink is not deposited in a region corresponding to the non-ejection nozzle, and a white stripe appears in the drawn image, as shown in FIG. 3A.

To reduce the influence of non-ejection, the density of ink ejected from nozzles on both sides of the non-ejection nozzle may be increased. That is, the nozzles (non-ejection correction nozzles) on the both sides of the non-ejection nozzle are set to a larger density value than a density value of another nozzle as shown in FIG. 3B.

Here, when the density value of another nozzle is expressed as D, the density values of the non-ejection correction nozzles are expressed as $m \times D$ ($m > 1$). The letter $m$ represents a non-ejection correction parameter for determining the intensity of non-ejection correction. A value that varies by each density value and by each non-ejection nozzle is set as the non-ejection correction parameter.

The non-ejection correction is performed by changing the density values of the non-ejection correction nozzles based on the non-ejection correction parameter as described above.

First Embodiment

Figure 4:
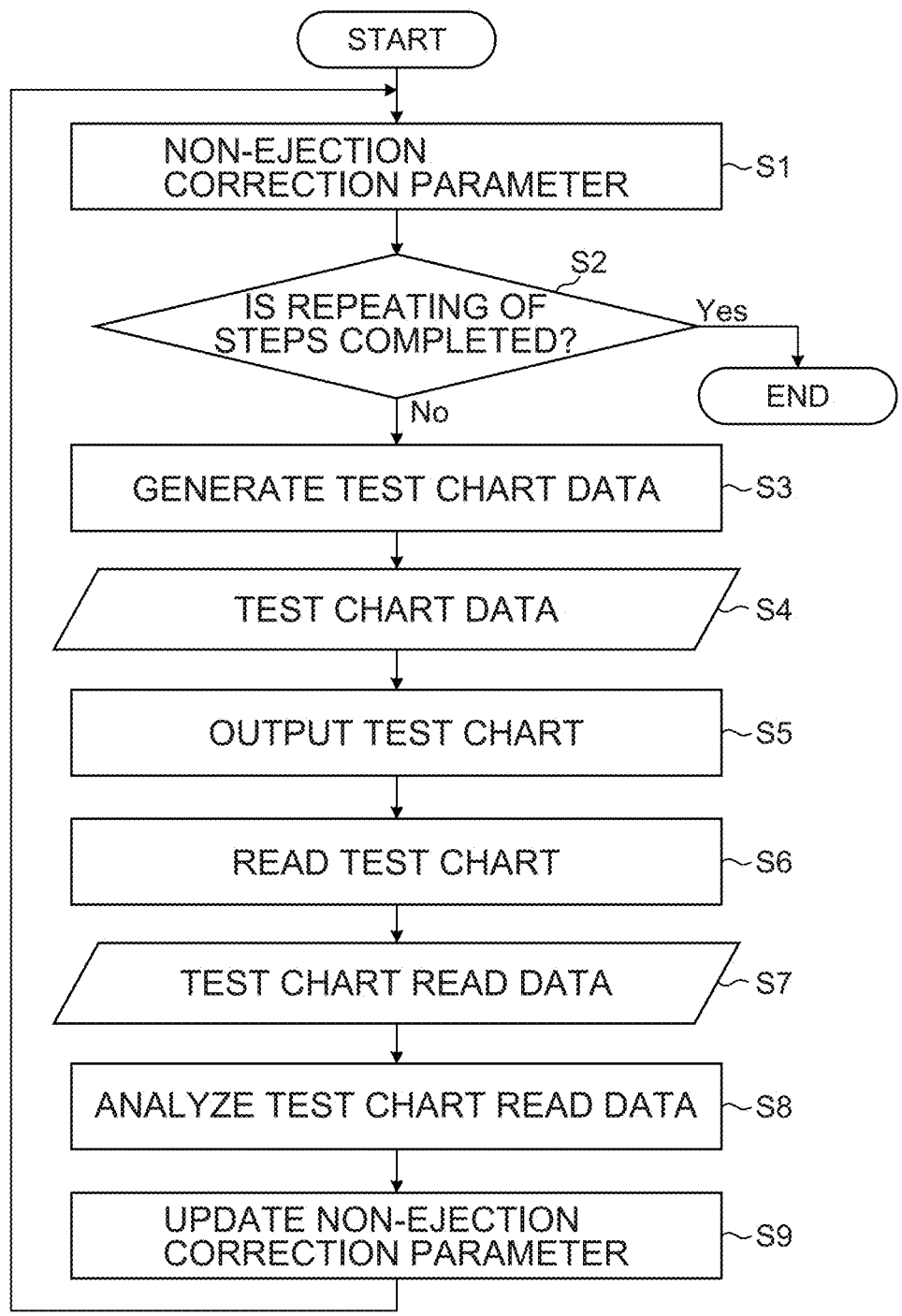
FIG. 4 is a flowchart illustrating a process for optimizing a non-ejection correction parameter.

FIG. 4 is a flowchart illustrating a process for optimizing the non-ejection correction parameter according to the present embodiment. Here, an optimizing process at a certain density value will be described.

A program for executing the process for optimizing the non-ejection correction parameter is stored in a ROM in the control unit 150, and executed by a CPU in the control unit 150. In another aspect, the control unit 150 may read out and execute the program when a removable recording medium in which the program is recorded is loaded into an input-output I/F (not shown) of the ink-jet recording apparatus 100.

(Step S1)

As described above, the non-ejection correction parameter is a parameter for correcting the white stripe generated by the non-ejection nozzle by using the non-ejection correction nozzles. A non-ejection correction parameter $m_i$ (i is a nozzle number) is provided for each of all the nozzles of the line head 120. A predetermined value is stored in the non-ejection correction parameter storage unit 152 as an initial value of the non-ejection correction parameter $m_i$.

(Step S2)

It is determined whether or not repeating of steps is completed.

The optimizing process in the present embodiment is performed by repeatedly performing respective steps of creating test chart data from the non-ejection correction parameter, outputting a test chart, scanning the test chart, calculating a correction intensity evaluation value by analysis of the scanned data, and updating the non-ejection correction parameter based on the correction intensity evaluation value.

When the repeating of steps is completed, the entire process is terminated since the non-ejection correction parameter has been optimized. When the repeating of steps is not completed, the process proceeds to step S3.

In the present embodiment, the repeating of steps is completed when the steps are repeated by a predetermined number of repetition times n. For example, n may be set to 5.

(Step S3: One Example of a Test Chart Data Generating Step)

The test chart data generating unit 154 reads out the non-ejection correction parameter for each of all the nozzles from the non-ejection correction parameter storage unit 152 (one example of an outputting step), and generates the test chart data.

Figure 5A:
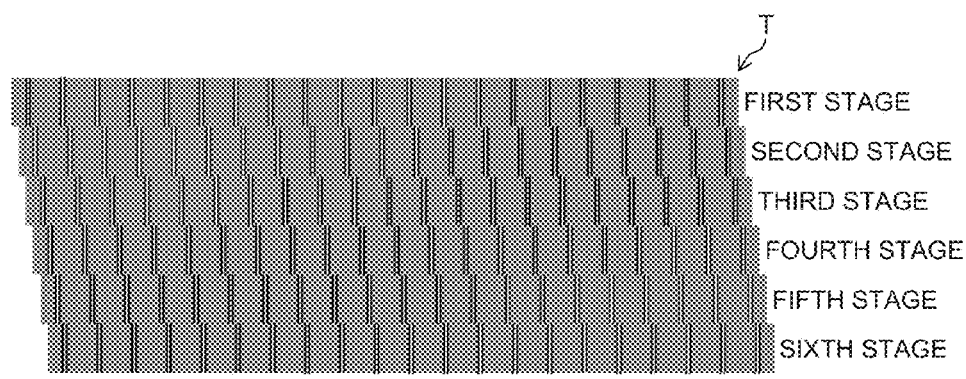
FIGS. 5A and 5B are views illustrating the configuration of a test chart.

FIG. 5A is a schematic view illustrating the configuration of a test chart T. Although the white stripe cannot be visually recognized as in the drawing in actual cases, the white stripe is shown clearly for the convenience of description.

In the test chart T, N stages (N=natural number, N=6 in the drawing) of patterns each having simulated non-ejection regions in which non-ejection is simulatively given at an interval of N nozzles are arranged in a solid image region (constant-density region) in a tone to be optimized. A region (non-ejection correction region) adjacent to each of the simulated non-ejection regions has a density obtained by applying the non-ejection correction parameter to the density of the constant-density region.

To form the test chart T, data for one stage of the test chart is configured such that a first nozzle (simulated non-ejection nozzle) provided at the interval of N nozzles in a direction (nozzle arrangement direction) perpendicular to a conveyance direction of the paper P forms the simulated non-ejection region without ejecting ink, second nozzles (non-ejection correction nozzles) on both sides of the first nozzle form the non-ejection correction region at an instruction value corrected based on the non-ejection correction parameter, and third nozzles other than the first nozzle and the second nozzles form the constant-density region at a non-corrected instruction value.

That is, the test chart T has the simulated non-ejection region formed by the first nozzle, the non-ejection correction region formed by the second nozzles on the both sides of the first nozzle, and the constant-density region formed by the third nozzles other than the first nozzle and the second nozzles. A plurality of stages in each of which the simulated non-ejection regions are arranged at a predetermined interval in a first direction are arranged in a second direction perpendicular to the first direction, and the simulated non-ejection regions in the plurality of stages are arranged at different positions from each other with respect to the first direction. The test chart data is data which does not cause the first nozzle to eject ink, causes the third nozzles to eject ink at an instruction value of a predetermined density, and causes the second nozzles to eject ink at an instruction value obtained by correcting the instruction value of the predetermined density based on the non-ejection correction parameter of the first nozzle adjacent thereto.

To be more specific, when the tone to be optimized (the instruction value) is expressed as D and the nozzle number of the first nozzle is expressed as i, the first nozzle is not caused to eject ink, the second nozzles with nozzle numbers i−1 and i+1 are caused to eject ink at an instruction value of $D \times m_i$, and the third nozzles with nozzle numbers i−N+1, . . . , i−3, i−2, i+2, i+3, . . . , and i+N−1 are caused to eject ink at an instruction value of D.

In the respective stages of the test chart T, the first nozzles are arranged to be shifted in the nozzle arrangement direction. In the example shown in FIG. 5A, the nozzle numbers of the first nozzles are shifted one by one (e.g., i, i+1, i+2, i+3, i+4, and i+5) in the respective stages. When the first nozzles are arranged to be shifted in the nozzle arrangement direction in the respective stages as described above, all the nozzles can be set as the simulated non-ejection nozzle. Accordingly, the non-ejection correction parameters for all the nozzles can be evaluated.

The length of each stage of the test chart T (the length in the conveyance direction of the paper P) may be appropriately determined according to a reading speed of the in-line sensor 140 and a conveyance speed of the paper P.

(Step S4)

The test chart data generated by the test chart data generating unit 154 is stored in the test chart data storage unit 156.

(Step S5: Test Chart Recording Step)

The control unit 150 reads out the test chart data stored in the test chart data storage unit 156, controls the respective nozzles of the line head 120 based on the test chart data, and outputs the test chart to the recording surface of the paper P.

(Step S6: Test Chart Acquiring Step)

The paper P to which the test chart is output is then conveyed to the conveying drum 114. The in-line sensor 140 reads the test chart on the paper P conveyed by the conveying drum 114, and generates the test chart read data.

The test chart is automatically read by using the in-line sensor 140 in the present embodiment. However, in another aspect, the test chart may be read by manually using a flat bed scanner or the like by a user.

(Step S7: One Example of a Read Data Acquiring Step)

The test chart read data generated by the in-line sensor 140 is acquired by a test chart read data acquiring unit 158 (one example of a read data acquiring device), and stored in the test chart read data storage unit 160. When the test chart is manually read by a user, the test chart read data may be input via an unillustrated inputting device by a user, acquired by the test chart read data acquiring unit 158, and stored in the test chart read data storage unit 160.

(Step S8: One Example of an Evaluating Step)

The test chart read data evaluating unit 162 (one example of an evaluating device) evaluates the correction intensity of the non-ejection correction parameter for each of the nozzles based on the test chart read data stored in the test chart read data storage unit 160.

To be more specific, an average density in the nozzle arrangement direction around the simulated non-ejection region is calculated, and the correction intensity evaluation value indicating whether the non-ejection correction is excessive or deficient is calculated with respect to each of the simulated non-ejection nozzles. The non-ejection correction is excessive correction when the correction intensity evaluation value is a positive value, and is deficient correction when the correction intensity evaluation value is a negative value. An optimum non-ejection correction parameter is obtained when the correction intensity evaluation value is zero.

For example, a difference between the average density around the simulated non-ejection region and a target density can be used as the correction intensity evaluation value. A difference (a chromaticity difference $\Delta E$) between an average chromaticity and a target chromaticity, or a difference (a luminance difference $\Delta Y$) between an average luminance and a target luminance may be also used.

(Step S9: One Example of a Parameter Updating Step)

The non-ejection correction parameter updating unit 164 (one example of a parameter updating device) updates the non-ejection correction parameter for each of the nozzles based on the evaluation result of the test chart read data. The updated non-ejection correction parameter for each of the nozzles is stored in the non-ejection correction parameter storage unit 152. The control unit 150 (one example of a controlling device) then causes the non-ejection correction parameter storage unit 152, the test chart data generating unit 154, the test chart data storage unit 156, the test chart read data acquiring unit 158, the test chart read data storage unit 160, the test chart read data evaluating unit 162, and the non-ejection correction parameter updating unit 164 to repeatedly perform the same operations (one example of a controlling step) until the repeating of the steps is determined to be completed in step S2.

In the present embodiment, the non-ejection correction parameter updating unit 164 updates the non-ejection correction parameter for each of the nozzles based on a single variable root-finding algorithm using iteration method represented by bisection method or the like. That is, the correction intensity evaluation value in each simulated non-ejection portion is regarded as an evaluation function of an optimization algorithm, and the non-ejection correction parameter is regarded as a design variable of the root-finding algorithm.

Here, the root-finding algorithm indicates a general numerical analysis algorithm for obtaining x that satisfies $f(x)=0$ with respect to a function $f(x)$. Various methods such as bisection method, golden section method, Brent's method, false position method, and Newton's method belong thereto. In the methods, generally, a process of determining a next measurement point from an initial measurement point or past n (about one or two) measurement points based on an algorithm specific to each method is repeated. In the present embodiment, the Brent's method is particularly preferably employed. Brent's method is a method having excellent convergence stability and convergence efficiency.

Figure 6:
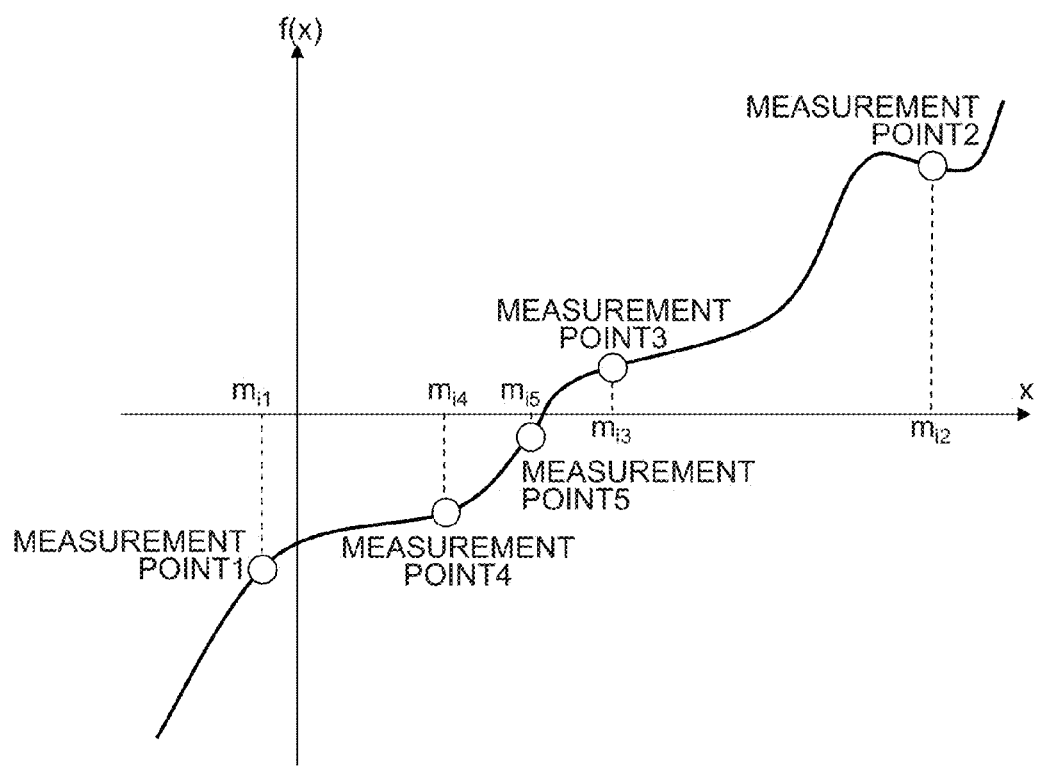
FIG. 6 is a schematic view illustrating the process of a root-finding algorithm.

FIG. 6 is a schematic view illustrating the process of the root-finding algorithm, and shows a state in which the updating of the non-ejection correction parameter is repeated five times with respect to the nozzle with the nozzle number i.

First, the initial value of the non-ejection correction parameter for the nozzle with the nozzle number i is set to $m_{i1}$ (step S1). The test chart data is then generated (step S3). Subsequently, the test chart is output based on the test chart data (step S5), and read by the in-line sensor 140 (step S6). The read data is further evaluated to calculate a correction intensity evaluation value $f(m_{i1})$ (measurement point 1) (step S8). Since the correction intensity evaluation value $f(m_{i1})$ is a negative value, the non-ejection correction is found to be deficient correction.

The non-ejection correction parameter updating unit 164 updates the non-ejection correction parameter to $m_{i1}$ based on the calculated correction intensity evaluation value $f(m_i)$.

The process returns to step S1, and the test chart data is generated based on the updated non-ejection correction parameter $m_{i2}$, output and read. The read data is evaluated to calculate a correction intensity evaluation value $f(m_{i2})$ (measurement point 2). Since the correction intensity evaluation value $f(m_{i2})$ is a positive value, the non-ejection correction is found to be excessive correction.

The non-ejection correction parameter updating unit 164 updates the non-ejection correction parameter to $m_{i3}$ based on the correction intensity evaluation values $f(m_{i1})$ and $f(m_{i2})$. The non-ejection correction parameter updating unit 164 calculates a correction intensity evaluation value $f(m_{i3})$ (measurement point 3), and updates the non-ejection correction parameter to $m_{i4}$.

As described above, the non-ejection correction parameters for all the nozzles can be efficiently optimized by repeating the steps using the root-finding algorithm. The steps may be repeated at least two times. For example, in the simple bisection method or the like, when two points with a solution therebetween are measured, a middle point therebetween is considered to be closer to an optimum value than the measured two points.

The same steps are performed with the density value changed, so that the non-ejection correction parameters can be optimized at all the density values (tones). To change the density value, the density value of the constant-density region in the test chart T may be changed.

In the present embodiment, it is desirable to set a value as close as possible to the optimum value as the initial value of the non-ejection correction parameter from the perspective of efficiency and accuracy. The initial value is desirably determined by using a method of calculating a theoretically correct value from halftone information and density design information, or a method of roughly measuring the non-ejection correction parameter by experiments. When the non-ejection correction parameter is adjusted again after passage of a given period of time after the non-ejection correction parameter is optimized, a previous optimization result of the non-ejection correction parameter may be used as the initial value.

The repeating of the steps may be determined to be completed when the correction intensity evaluation values such as a chromaticity difference $\Delta E$ and a luminance difference $\Delta Y$ for all the nozzles to be optimized are equal to or less than a given value. Alternatively, the repeating of the steps may be determined to be completed at a point at which the correction intensity evaluation values for all the nozzles are equal to or less than a given value with a predetermined number of repetition times n set as the upper limit.

Figure 5B:
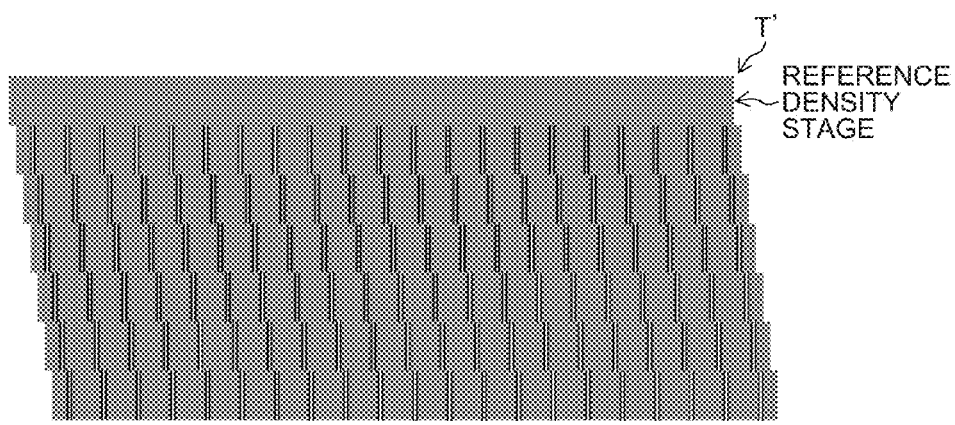

Also, a reference density stage may be provided in the test chart as in a test chart T' shown in FIG. 5B. The reference density stage is obtained by drawing a constant-density region in a tone to be optimized by using all the nozzles. When the reference density stage is provided, a difference between a scanned density (the average density) around the simulated non-ejection region and a scanned density in the reference density stage may be used as the correction intensity evaluation value. Accordingly, unevenness in shading or resolution in the nozzle direction of the in-line sensor 140 can be offset, and the influence of low-frequency stripe unevenness specific to the single pass system can be reduced.

Although the nozzles on the both sides of the simulated non-ejection nozzle are employed as the non-ejection correction nozzles and the non-ejection correction parameter of the simulated non-ejection nozzle is applied to the non-ejection correction nozzles in the present embodiment, the non-ejection correction nozzles are not limited to the aspect. For example, nozzles adjacent to the nozzles on the both sides of the simulated non-ejection nozzle may be further employed as the non-ejection correction nozzles. That is, when the nozzle with the nozzle number i is set as the simulated non-ejection nozzle, nozzles with nozzle numbers i−2, i−1, i+1, and i+2 may be employed as the non-ejection correction nozzles.

In this case, the non-ejection correction parameter for each of the non-ejection correction nozzles may be optimized.

Second Embodiment

In the first embodiment, the non-ejection correction parameter is directly used as the design variable of the root-finding algorithm. Here, an assumption that "the non-ejection correction parameters applied to the nozzles at the right and left of the non-ejection nozzle are equal to each other" is implicitly employed. However, the nozzles on the head are not always arranged symmetrically. Thus, it is sometimes effective to perform the non-ejection correction by using different parameters for the right and left nozzles.

In this case, a non-ejection correction parameter composed of a plurality of correction parameters expressed with a common variable may be applied to the right and left non-ejection correction nozzles.

For example, a correction parameter $P_L$ for the left non-ejection correction nozzle and a correction parameter $P_R$ for the right non-ejection correction nozzle (corresponding to a plurality of parameters) are defined in a general expression as described below by using a variable x common to the two parameters.

$$P_L = g(x), P_R = h(x) \quad \text{(Expression 1)}$$

Here, g(x) and h(x) are any functions with a variable x. The parameters are defined as described above, and the design variable of the root-finding algorithm in a present embodiment is set as x. The non-ejection correction parameter composed of the different correction parameters for the right and left nozzles can be thereby optimized. One example of the functions g(x) and h(x) is as follows.

$$g(x) = x, h(x) = x \quad \text{(Expression 2)}$$

Here, the example can be considered to be similar to the first embodiment in which the same non-ejection correction parameter is applied to the right and left non-ejection correction nozzles.

$$g(x) = a \times x, h(x) = b \times x \text{ ($a$ and $b$ are different constants)} \quad \text{(Expression 3)}$$

Also, when the functions g(x) and h(x) are defined as described above, a non-ejection correction parameter having different correction parameters for the right and left non-ejection correction nozzles can be generated.

$$g(x) = x, h(x) = c \text{ ($c$ is a constant)} \quad \text{(Expression 4)}$$

Also, when the functions g(x) and h(x) are defined as described above, a non-ejection correction parameter in which a correction parameter for one (right) non-ejection correction nozzle out of the right and left nozzles is fixed and only a correction parameter for the other (left) non-ejection correction nozzle is optimized can be also generated.

As for the correction parameters expressed in Expressions 2 to 4, the correction parameter of one of the expressions may be equally applied to all the nozzles, or the correction parameter of an optimum expression may be selected and applied with respect to each non-ejection nozzle.

In another aspect, the plurality of parameters of the non-ejection correction parameter may be set as a correction parameter $Q_1$ to be applied to the nozzles (nozzle number i±1) on the both sides of the non-ejection nozzle (nozzle number i), and a correction parameter $Q_2$ to be applied to the nozzles (nozzle number i±2) adjacent to the nozzles on the both sides, expressed as a function x with a common variable, and optimized by using x as the design variable of the root-finding algorithm.

[Another Embodiment of the Ink-Jet Recording Apparatus]

Figure 7:
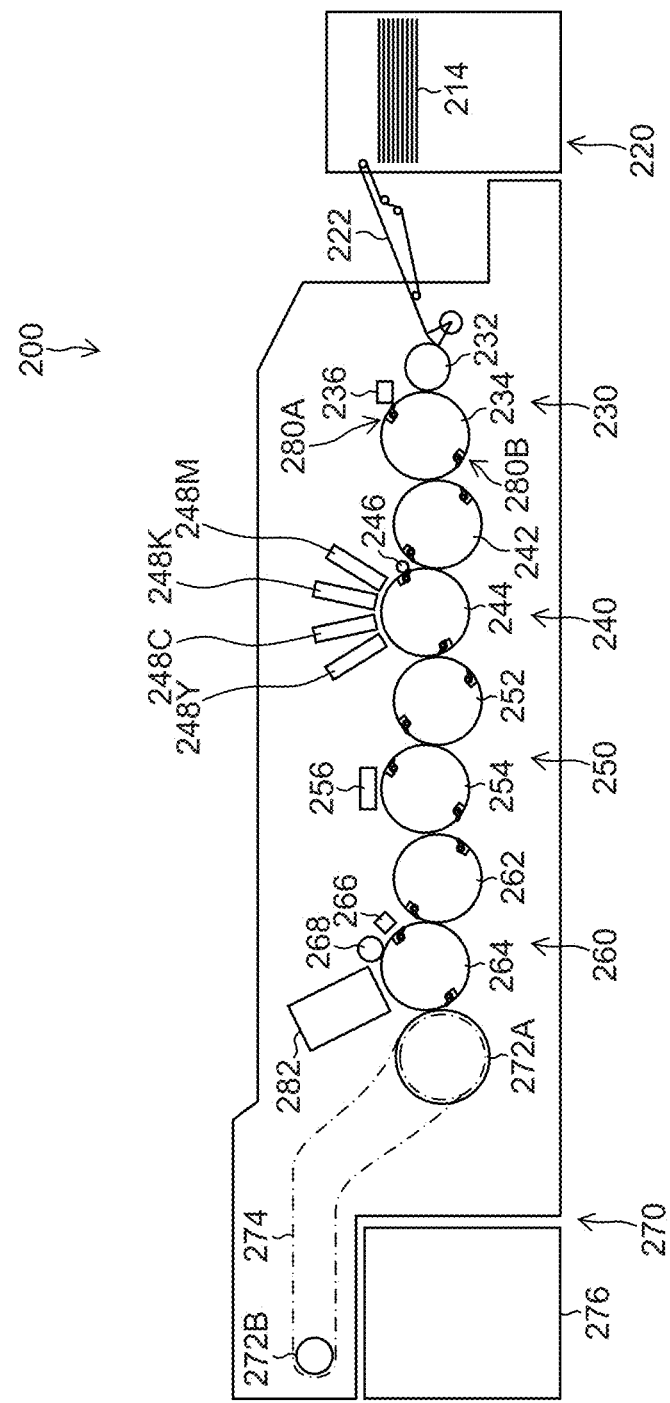
FIG. 7 is a configuration view illustrating the entire configuration of the ink-jet recording apparatus.

FIG. 7 is a configuration view illustrating the entire configuration of the ink-jet recording apparatus according to another embodiment. An ink-jet recording apparatus 200 shown in the drawing is a recording apparatus of two-liquid aggregation type which forms an image on a recording surface of a recording medium 214 based on predetermined image data by using ink containing a coloring material, and an aggregating treatment liquid having a function to aggregate the ink.

The ink-jet recording apparatus 200 mainly includes a paper feeding unit 220, a treatment liquid applying unit 230, a drawing unit 240, a drying treatment unit 250, a fixing treatment unit 260, and a discharging unit 270. Although not shown in FIG. 7, a liquid ejecting device is provided in the drawing unit 240.

Transfer cylinders 232, 242, 252, and 262 are provided in previous stages of the treatment liquid applying unit 230, the drawing unit 240, the drying treatment unit 250, and the fixing treatment unit 260, respectively, as a device for transferring the conveyed recording medium 214. Impression cylinders 234, 244, 254, and 264 having a drum-like shape are also provided in the treatment liquid applying unit 230, the drawing unit 240, the drying treatment unit 250, and the fixing treatment unit 260, respectively, as a device for holding and conveying the recording medium 214.

Grippers 280A and 280B which sandwich and hold a distal end portion of the recording medium 214 are provided at predetermined positions on an outer peripheral surface of each of the transfer cylinders 232 to 262 and the impression cylinders 234 to 264. The gripper 280A and the gripper 280B have the same structure for sandwiching and holding the distal end portion of the recording medium 214 and the same structure for transferring the recording medium 214 to and from the gripper provided on another impression cylinder or another transfer cylinder. The gripper 280A and the gripper 280B are also arranged at symmetrical positions apart from each other by an angle of 180° in a rotating direction of the impression cylinder 234 on the outer peripheral surface of the impression cylinder 234.

When the transfer cylinders 232 to 262 and the impression cylinders 234 to 264 are rotated in a predetermined direction with the distal end portion of the recording medium 214 sandwiched by the grippers 280A and 280B, the recording medium 214 is rotationally conveyed along the outer peripheral surfaces of the transfer cylinders 232 to 262 and the impression cylinders 234 to 264.

In FIG. 7, only the grippers provided on the impression cylinder 234 are assigned reference numerals 280A and 280B. Reference numerals of the grippers on the other impression cylinders and transfer cylinders are omitted.

When the recording medium (paper sheet) 214 accommodated in the paper feeding unit 220 is fed to the treatment liquid applying unit 230, the aggregating treatment liquid (also simply referred to as "treatment liquid" below) is applied to the recording surface of the recording medium 214 held on the outer peripheral surface of the impression cylinder 234. The "recording surface of the recording medium 214" means an outer side surface in a state in which the recording medium 214 is held on the impression cylinders 234 to 264, and a surface opposite to a surface held on the impression cylinders 234 to 264.

The recording medium 214 to which the aggregating treatment liquid is applied is then fed to the drawing unit 240, where a desired image is formed by applying color ink to a region of the recording surface where the aggregating treatment liquid is applied.

Moreover, the recording medium 214 on which the image is formed by the color ink is fed to the drying treatment unit 250, where the recording medium 214 is subjected to drying treatment. After the drying treatment, the recording medium 214 is fed to the fixing treatment unit 260, where the recording medium 214 is subjected to fixing treatment. By performing the drying treatment and the fixing treatment, the image on the recording medium 214 is firmly formed. After the desired image is formed on the recording surface of the recording medium 214 and fixed to the recording surface of the recording medium 214 as described above, the recording medium 214 is conveyed to outside of the apparatus from the discharging unit 270.

In the following, the respective units of the ink-jet recording apparatus 200 (the paper feeding unit 220, the treatment liquid applying unit 230, the drawing unit 240, the drying treatment unit 250, the fixing treatment unit 260, and the discharging unit 270) will be described in detail.

(Paper Feeding Unit)

The paper feeding unit 220 is provided with a paper feeding tray 222 and an unillustrated feeding mechanism, and configured so as to feed the recording medium 214 one by one from the paper feeding tray 222. The recording medium 214 fed from the paper feeding tray 222 is determined in position by an unillustrated guide member such that the distal end portion is located at the position of the gripper (not shown) on the transfer cylinder (paper feeding cylinder) 232, and is thereby temporarily stopped. The gripper (not shown) sandwiches and holds the distal end portion of the recording medium 214, and transfers the recording medium 214 to the gripper provided on the treatment liquid cylinder 234.

(Treatment Liquid Applying Unit)

The treatment liquid applying unit 230 includes the treatment liquid cylinder (treatment liquid drum) 234 which holds the recording medium 214 transferred from the paper feeding cylinder 232 on the outer peripheral surface, and conveys the recording medium 214 in a predetermined conveyance direction, and a treatment liquid applying device 236 which applies the treatment liquid to the recording surface of the recording medium 214 held on the outer peripheral surface of the treatment liquid cylinder 234. When the treatment liquid cylinder 234 is rotated in a counterclockwise direction in FIG. 7, the recording medium 214 is rotationally conveyed in the counterclockwise direction along the outer peripheral surface of the treatment liquid cylinder 234.

The treatment liquid applying device 236 shown in FIG. 7 is provided at a position facing the outer peripheral surface (recording medium holding surface) of the treatment liquid cylinder 234. As a configuration example of the treatment liquid applying device 236, the treatment liquid applying device 236 may include a treatment liquid vessel in which the treatment liquid is stored, a drawing roller which is partially immersed in the treatment liquid in the treatment liquid vessel to draw the treatment liquid in the treatment liquid vessel, and an application roller (rubber roller) which moves the treatment liquid drawn by the drawing roller onto the recording medium 214.

The treatment liquid applying device 236 may preferably include an application roller moving mechanism which moves the application roller in a vertical direction (a direction normal to the outer peripheral surface of the treatment liquid cylinder 234) such that the treatment liquid is not applied to a portion other than the recording medium 214. The grippers 280A and 280B which sandwich the distal end portion of the recording medium 214 are arranged so as not to project from the peripheral surface.

The treatment liquid applied to the recording medium 214 by the treatment liquid applying device 236 contains a coloring material aggregating agent which aggregates the coloring material (pigment) in the ink to be applied by the drawing unit 240. When the treatment liquid and the ink come into contact with each other on the recording medium 214, the coloring material and a solvent in the ink are encouraged to be separated.

The treatment liquid applying device 236 preferably applies the treatment liquid while measuring the amount applied to the recording medium 214. The film thickness of the treatment liquid on the recording medium 214 is preferably made sufficiently smaller than the diameter of an ink droplet ejected from the drawing unit 240.

(Drawing Unit)

The drawing unit 240 includes the drawing cylinder (drawing drum) 244 which holds and conveys the recording medium 214, a paper pressing roller 246 which brings the recording medium 214 into close contact with the drawing cylinder 244, and ink-jet heads 248M, 248K, 248C, and 248Y which apply ink to the recording medium 214. The drawing cylinder 244 has a basic structure similar to that of the treatment liquid cylinder 234 described above.

The paper pressing roller 246 is a guide member which brings the recording medium 214 into close contact with the outer peripheral surface of the drawing cylinder 244. The paper pressing roller 246 is arranged facing the outer peripheral surface of the drawing cylinder 244 on a downstream side in the conveyance direction of the recording medium 214 from a position of transferring the recording medium 214 between the transfer cylinder 242 and the drawing cylinder 244, and on an upstream side in the conveyance direction of the recording medium 214 from the ink-jet heads 248M, 248K, 248C, and 248Y.

A paper uplift detecting sensor (not shown) is also arranged between the paper pressing roller 246 and the ink-jet head 248M located on the most upstream side in the conveyance direction of the recording medium 214. The paper uplift detecting sensor detects the amount of uplift of the recording medium 214 immediately before entering a region beneath the ink-jet heads 248M, 248K, 248C, and 248Y. The ink-jet recording apparatus 200 in the present embodiment is configured to inform a user and stop conveying the recording medium 214 when the amount of uplift of the recording medium 214 detected by the paper uplift detecting sensor exceeds a predetermined threshold value.

The recording medium 214 transferred to the drawing cylinder 244 from the transfer cylinder 242 is pressed by the paper pressing roller 246 and comes into close contact with the outer peripheral surface of the drawing cylinder 244 while being rotationally conveyed with the distal end held by the gripper (reference numeral is omitted). After coming into close contact with the outer peripheral surface of the drawing cylinder 244 as described above, the recording medium 214 is fed to a printing region beneath the ink-jet heads 248M, 248K, 248C, and 248Y in a state in which the recording medium 214 is not uplifted from the outer peripheral surface of the drawing cylinder 244.

The ink-jet heads 248M, 248K, 248C, and 248Y respectively correspond to four colors of magenta (M), black (K), cyan (C), and yellow (Y). The ink-jet heads 248M, 248K, 248C, and 248Y are arranged sequentially from the upstream side in the rotating direction of the drawing cylinder 244 (the counterclockwise direction in FIG. 7), and also arranged such that ink ejection surfaces (nozzle surfaces) of the ink-jet heads 248M, 248K, 248C, and 248Y face the recording surface of the recording medium 214 held on the drawing cylinder 244. The "ink ejection surfaces (nozzle surfaces)" mean surfaces of the ink-jet heads 248M, 248K, 248C, and 248Y facing the recording surface of the recording medium 214, and surfaces where nozzles for ejecting ink (shown with reference numeral 51 in FIG. 8) described below are formed.

The ink-jet heads 248M, 248K, 248C, and 248Y shown in FIG. 7 are also arranged to be inclined with respect to a horizontal plane such that the recording surface of the recording medium 214 held on the outer peripheral surface of the drawing cylinder 244 and the nozzle surfaces of the ink-jet heads 248M, 248K, 248C, and 248Y are substantially parallel to each other.

The ink-jet heads 248M, 248K, 248C, and 248Y are full-line heads having a length corresponding to the maximum width (the length in a direction perpendicular to the conveyance direction of the recording medium 214) of an image formation region of the recording medium 214. The ink-jet heads 248M, 248K, 248C, and 248Y are fixedly arranged so as to extend in the direction perpendicular to the conveyance direction of the recording medium 214.

The ink ejecting nozzles are arranged in a matrix and formed on each of the nozzle surfaces (liquid ejection surfaces) of the ink-jet heads 248M, 248K, 248C, and 248Y over the entire width of the image formation region of the recording medium 214.

When the recording medium 214 is conveyed to the printing region beneath the ink-jet heads 248M, 248K, 248C, and 248Y, ink in each color is ejected (deposited) on the region of the recording medium 214 to which the aggregating treatment liquid is applied from the ink-jet heads 248M, 248K, 248C, and 248Y based on image data.

When the ink-jet heads 248M, 248K, 248C, and 248Y eject droplets of the corresponding colored ink toward the recording surface of the recording medium 214 held on the outer peripheral surface of the drawing cylinder 244, the treatment liquid and the ink come into contact with each other on the recording medium 214. An aggregation reaction of a coloring material (pigment-based coloring material) dispersed in the ink or an insoluble coloring material (dye-based coloring material) is thereby expressed to form a coloring material aggregate. Accordingly, movement of the coloring material (displacement of dots, color unevenness of dots) in the image formed on the recording medium 214 is prevented.

Since the drawing cylinder 244 of the drawing unit 240 is structurally separated from the treatment liquid cylinder 234 of the treatment liquid applying unit 230, the treatment liquid does not adhere to the ink-jet heads 248M, 248K, 248C, and 248Y. Thus, factors causing abnormal ink ejection can be reduced.

Although the configuration of the standard colors (four colors) of MKCY is exemplified in the present embodiment, the combinations of the ink colors and the number of colors are not limited to that in the present embodiment, and paler ink, deeper ink, and ink of special color may be added if necessary. For example, an ink-jet head which ejects light-colored ink such as light cyan and light magenta may be added. An arrangement order of the respective color heads is also not particularly limited.

(Drying Treatment Unit)

The drying treatment unit 250 includes the drying cylinder (drying drum) 254 which holds and conveys the recording medium 214 on which the image has been formed, and a drying treatment device 256 which performs the drying treatment to evaporate a water content (liquid component) on the recording medium 214. Since the drying cylinder 254 has a basic configuration similar to those of the treatment liquid cylinder 234 and the drawing cylinder 244 described above, the description is omitted here.

The drying treatment device 256 is a treatment unit which is arranged at a position facing the outer peripheral surface of the drying cylinder 254 to evaporate the water content existing on the recording medium 214. When the ink is applied to the recording medium 214 by the drawing unit 240, a liquid component (solvent component) of the ink and a liquid component (solvent component) of the treatment liquid separated by the aggregation reaction between the treatment liquid and the ink remains on the recording medium 214. It is thus necessary to remove the liquid components as described above.

The drying treatment device 256 is a treatment unit which performs the drying treatment to evaporate the liquid component existing on the recording medium 214 by heating by a heater, blowing air by a fan, or using both the heater and the fan, and thereby removes the liquid components on the recording medium 214. The amounts of heating and air blowing to be applied to the recording medium 214 are appropriately set according to parameters such as the water content remaining on the recording medium 214, the type of the recording medium 214, and the conveyance speed (drying treatment time) of the recording medium 214.

Since the drying cylinder 254 of the drying treatment unit 250 is structurally separated from the drawing cylinder 244 of the drawing unit 240, factors causing abnormal ink ejection, such as drying of head meniscus portions by the heat or blown air in the ink-jet heads 248M, 248K, 248C, and 248Y in the drying treatment by the drying treatment device 256, can be reduced.

To correct cockling of the recording medium 214, a curvature of the drying cylinder 254 may be set to 0.002 (1/mm) or more. To prevent the recording medium from curving (curling) after the drying treatment, the curvature of the drying cylinder 254 may be set to 0.0033 (1/mm) or less.

A device for adjusting a surface temperature of the drying cylinder 254 (e.g., a built-in heater) may be also provided so as to adjust the surface temperature to 50° C. or more. When the heating treatment is performed from a rear surface of the recording medium 214, the recording medium 214 is encouraged to be dried, so that the image is prevented from being destroyed in the fixing treatment in a next stage. In this aspect, it is more effective to provide a device for bringing the recording medium 214 into close contact with the outer peripheral surface of the drying cylinder 254. Examples of the device for bringing the recording medium 214 into close contact include vacuum adhesion and electrostatic adhesion.

Although the upper limit of the surface temperature of the drying cylinder 254 is not particularly limited, the surface temperature is preferably set to 75° C. or less (more preferably, 60° C. or less) from the perspective of the safety of maintenance (prevention of burn injuries due to high temperature) such as cleaning of ink adhering to the surface of the drying cylinder 254.

Drying unevenness due to wrinkles or uplifts of the recording medium 214 can be reliably prevented by holding the recording medium 214 on the outer peripheral surface of the drying cylinder 254 having the above configuration with the recording surface directed outward (that is, the recording medium 214 is curved such that the recording surface is located on a convex side), and performing the drying treatment while rotationally conveying the recording medium 214.

(Fixing Treatment Unit)

The fixing treatment unit 260 includes the fixing cylinder (fixing drum) 264 which holds and conveys the recording medium 214, a heater 266 which gives heating treatment to the recording medium 214 on which the image is formed and from which the liquid is removed, and a fixing roller 268 which presses the recording medium 214 from the recording surface side. Since the fixing cylinder 264 has a basic configuration similar to those of the treatment liquid cylinder 234, the drawing cylinder 244, and the drying cylinder 254, the description is omitted here. The heater 266 and the fixing roller 268 are arranged at positions facing the outer peripheral surface of the fixing cylinder 264, and arranged sequentially from the upstream side in the rotating direction (the counterclockwise direction in FIG. 7) of the fixing cylinder 264.

In the fixing treatment unit 260, the heater 266 gives preheating treatment to the recording surface of the recording medium 214, and the fixing roller 268 gives the fixing treatment thereto. A heating temperature of the heater 266 is appropriately set according to the type of the recording medium, the type of the ink (the type of polymer fine particles contained in the ink), or the like. For example, the heating temperature may be set to a glass transition temperature or a minimum film forming temperature of the polymer fine particles contained in the ink.

The fixing roller 268 is a roller member which melts and fixes the self-dispersible polymer fine particles in the ink by heating and pressurizing the dried ink, and thereby forms the ink into a film. The fixing roller 268 is configured to heat and pressurize the recording medium 214. To be more specific, the fixing roller 268 is arranged so as to be in pressure contact with the fixing cylinder 264, and constitutes a nip roller with the fixing cylinder 264. Accordingly, the recording medium 214 is sandwiched between the fixing roller 268 and the fixing cylinder 264, nipped under a predetermined nip pressure, and thereby subjected to the fixing treatment.

As a configuration example of the fixing roller 268, the fixing roller 268 may be composed of a heating roller in which a halogen lamp is incorporated in a metal pipe of aluminum or the like having good heat conductivity. By heating the recording medium 214 by the heating roller as described above, heat energy having a temperature equal to or higher than the glass transition temperature of the polymer fine particles contained in the ink is applied, so that the polymer fine particles are melted to form a transparent film on the surface of the image.

The recording surface of the recording medium 214 is pressurized in the above state. Accordingly, the molten polymer fine particles are pushed and fixed into irregularities in the recording medium 214, and the irregularities in the image surface are thereby leveled, so that a preferable gloss can be obtained. It is also preferable that a plurality of fixing rollers 268 are provided according to the thickness of an image layer or the glass transition temperature characteristics of the polymer fine particles.

The fixing roller 268 preferably has a surface hardness of 71° or less. When the surface of the fixing roller 268 is made softer, an adhesion effect with respect to the irregularities in the recording medium 214 generated by cockling can be expected. Fixing unevenness due to the irregularities in the recording medium 214 can be thereby more effectively prevented.

In the ink-jet recording apparatus 200 shown in FIG. 7, an in-line sensor 282 is provided in a subsequent stage (the downstream side in the recording medium conveyance direction) of the treatment region of the fixing treatment unit 260. The in-line sensor 282 is a sensor which reads the image formed on the recording medium 214 (or a check pattern formed in a marginal region of the recording medium 214). A CCD line sensor is preferably used as the in-line sensor 282.

The ink-jet recording apparatus 200 described in the present embodiment determines whether or not the ejection from the ink-jet heads 248M, 248K, 248C, and 248Y is abnormal based on the reading result of the in-line sensor 282. In one aspect, the in-line sensor 282 may include a measuring device which measures a water content, a surface temperature, a gloss degree or the like. In the aspect, parameters such as the treatment temperature of the drying treatment unit 250, and the heating temperature and the applied pressure of the fixing treatment unit 260 are appropriately adjusted based on the reading result of the water content, the surface temperature, and the gloss degree, and the above control parameters are appropriately adjusted in response to a temperature change inside the apparatus or a temperature change in the respective units.

(Discharging Unit)

As shown in FIG. 7, the discharging unit 270 is provided subsequent to the fixing treatment unit 260. The discharging unit 270 includes an endless conveying chain 274 wound around tension rollers 272A and 272B, and a discharging tray 276 where the recording medium 214 on which the image has been formed is accommodated.

The recording medium 214 after the fixing treatment fed from the fixing treatment unit 260 is conveyed by the conveying chain 274 and discharged to the discharging tray 276.

[Structure of the Ink-Jet Head]

Next, one example of the structures of the ink-jet heads 248M, 248K, 248C, and 248Y provided in the drawing unit 240 will be described. Since the structures of the ink-jet heads 248M, 248K, 248C, and 248Y corresponding to the respective colors are common to each other, reference numeral 50 representatively designates the ink-jet head (also simply referred to as "head" below) in the following.

Figure 8A:
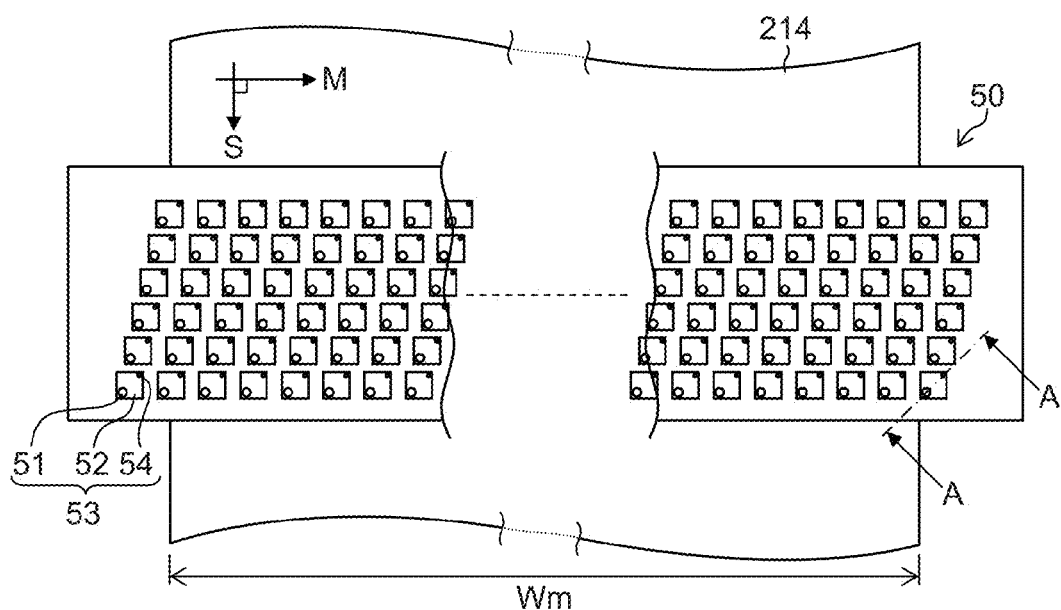
FIGS. 8A and 8B are views illustrating a configuration example of a head.
Figure 8B:
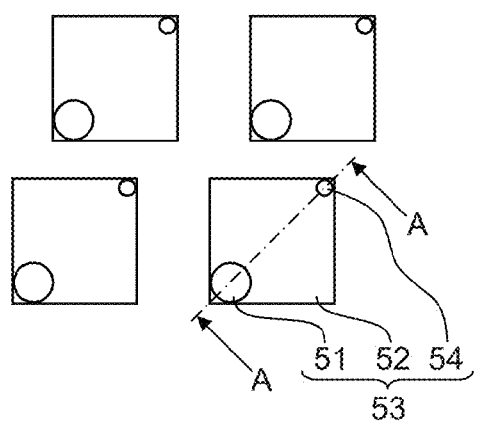
Figure 9:
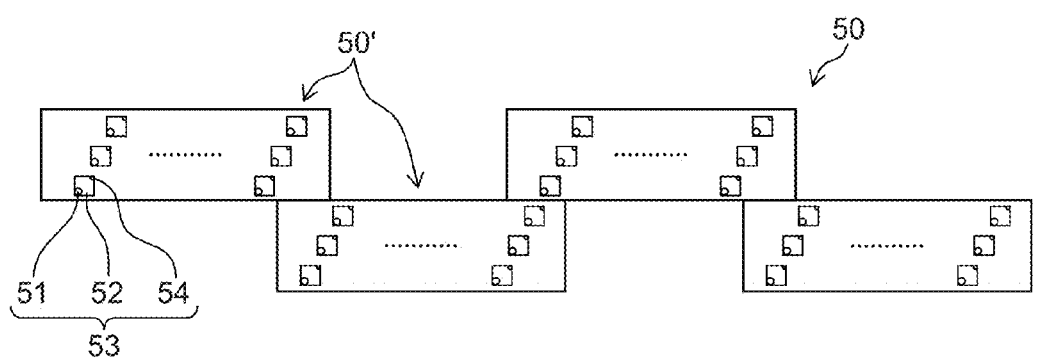
FIG. 9 is a view illustrating a head in which short head modules are arranged in a staggered pattern.
Figure 10:
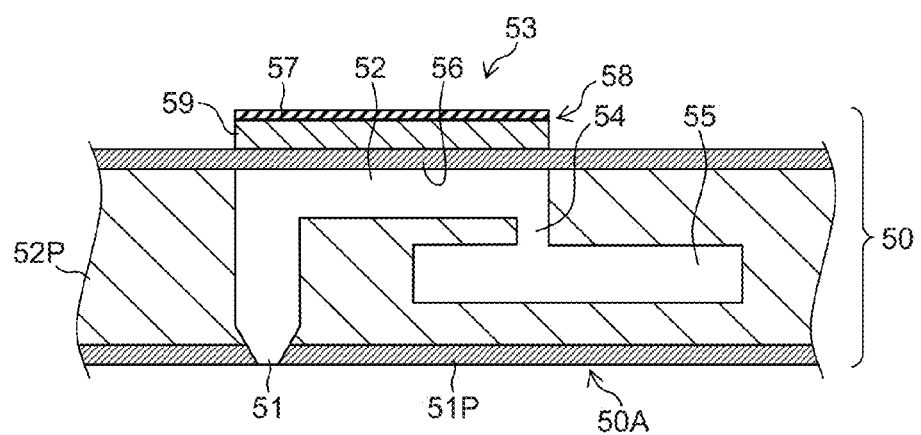
FIG. 10 is a sectional view illustrating the stereoscopic configuration of a droplet ejecting element.

FIG. 8A is a plan perspective view illustrating a configuration example of the head 50, and FIG. 8B is an enlarged view of a portion of the head 50. FIG. 9 is a plan perspective view illustrating another configuration example of the head 50, and FIG. 10 is a sectional view (sectional view taken along a line A-A in FIG. 8B) illustrating the stereoscopic configuration of a droplet ejecting element for one channel as the unit of a recording element (an ink-chamber unit corresponding to one nozzle 51).

As shown in FIGS. 8A and 8B, a plurality of nozzles 51 as ink ejection ports are arranged on the head 50 in the present embodiment over the entire width of an image formation region of a nozzle surface of the head 50 facing the recording medium 214. Accordingly, higher density of a substantial nozzle interval (projection nozzle pitch) that is projected (orthogonally projected) to be parallel to a head longitudinal direction (the direction perpendicular to the feeding direction of the recording medium 214) can be achieved.

The form in which a nozzle row is configured over a length equal to or larger than a length corresponding to an entire width $W_m$ of the recording medium 214 in the direction (the direction of an arrow M; a main scanning direction) substantially perpendicular to the conveyance direction (the direction of an arrow S; a sub scanning direction) of the recording medium 214 is not limited to that of the present embodiment. For example, the line head 50 may be configured to have a nozzle row over the length corresponding to the entire width of the recording medium 214 by arranging in a staggered pattern short head modules 50' in each of which the plurality of nozzles 51 are arranged in two dimensions, and connecting the head modules 50' as shown in FIG. 9 instead of the configuration in FIG. 8A.

A pressure chamber 52 provided corresponding to each of the nozzles 51 has a schematic square shape as the planar shape (see FIGS. 8A and 8B). An outflow port communicating with the nozzle 51 is provided in one of two diagonally-opposite corner portions and a supply ink inflow port (supply port) 54 is provided in the other of the two corner portions. The pressure chamber 52 is not limited to the shape of the present embodiment, and may have various shapes such as a quadrangular shape (rhomboid, rectangle, or the like), a pentagonal shape, a hexagonal shape or other polygonal shape, a circular shape, and an oval shape as the planar shape.

As shown in FIG. 10, the head 50 has a structure in which a nozzle plate 51P, a flow path plate 52P, a vibration plate 56 or the like are laminated and joined together. The nozzle plate 51P constitutes a nozzle surface 50A of the head 50. The plurality of nozzles 51 each communicating with each pressure chamber 52 are two-dimensionally formed.

The flow path plate 52P is a flow path forming member which constitutes a side wall portion of the pressure chamber 52, and forms the supply port 54 as a narrowed portion (most constricted portion) of an individual supply path for guiding ink to the pressure chamber 52 from a common flow path 55. Although simply shown in FIG. 10 for the convenience of description, the flow path plate 52P has a structure in which a single or a plurality of substrates are laminated.

The vibration plate 56 constitutes one wall surface (an upper surface in FIG. 10) of the pressure chamber 52, is made of a conductive material such as stainless steel (SUS) and silicon (Si) with a nickel (Ni) conductive layer, and doubles as a common electrode for a plurality of actuators (here, piezoelectric elements) 58 arranged corresponding to the respective pressure chambers 52. In another aspect, the vibration plate may be made of a non-conductive material such as resin. In this case, a common electrode layer of a conductive material such as metal is formed on a surface of the vibration plate member.

A piezoelectric body 59 is provided at a position corresponding to each of the pressure chambers 52 on a surface of the vibration plate 56 opposite to the pressure chamber 52 (an upper side in FIG. 10). An individual electrode 57 is formed on an upper surface of the piezoelectric body 59 (a surface opposite to a surface in contact with the vibration plate 56 that doubles as a common electrode). The individual electrode 57, the common electrode facing the individual electrode 57 (the vibration plate 56 doubles as the common electrode in the present embodiment), and the piezoelectric body 59 interposed to be sandwiched between the electrodes constitute the piezoelectric element which functions as the actuator 58. The piezoelectric body 59 is preferably made of a piezoelectric material such as lead zirconate titanate and barium titanate.

Each of the pressure chambers 52 communicates with the common flow path 55 via the supply port 54. The common flow path 55 communicates with an ink tank (not shown) as an ink supply source. Ink supplied from the ink tank is distributed and supplied to the respective pressure chambers 52 through the common flow path 55.

When a driving voltage is applied between the individual electrode 57 and the common electrode of the actuator 58, the actuator 58 is deformed to change the volume of the pressure chamber 52. A pressure change is thereby caused to eject ink from the nozzle 51. The pressure chamber 52 is filled again with new ink through the supply port 54 from the common flow path 55 when the displacement of the actuator 58 is restored after the ink ejection.

Figure 11:
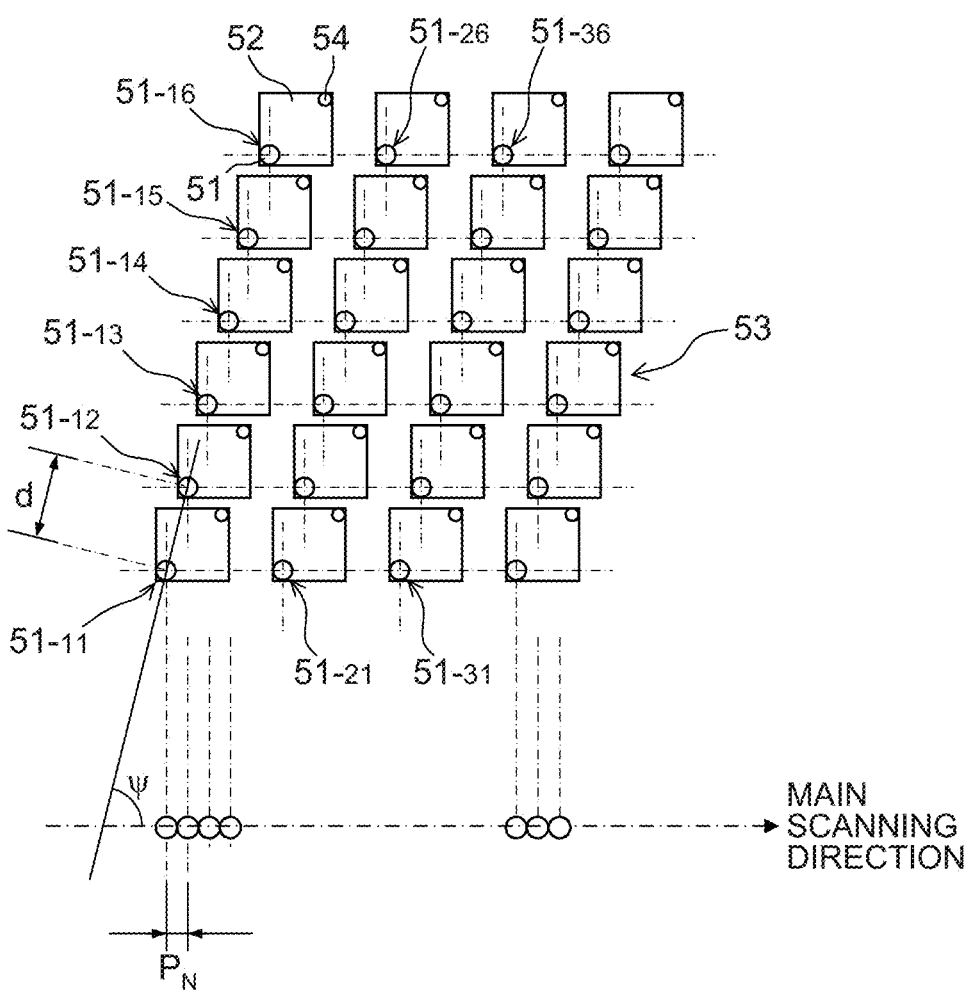
FIG. 11 is a view illustrating the arrangement of nozzles in a matrix.

The structure in which a plurality of ink chamber units 53 having the aforementioned structure are arranged at a given pitch d in the direction of a certain angle ψ with respect to the main scanning direction as shown in FIG. 11 can be considered to be substantially equivalent to a structure in which the respective nozzles 51 are linearly arranged at a given pitch of $P_N = d \times \cos \psi$ with respect to the main scanning direction (corresponding to the first direction).

When the nozzles are arranged in a matrix as shown in FIG. 11, nozzles 51-11, 51-12, 51-13, 51-14, 51-15, and 51-16 are regarded as one block (also, nozzles 51-21 to 51-26 as one block, nozzles 51-31 to 51-36 as one block, and so on). The nozzles 51-11, 51-12, . . . , 51-16 are sequentially driven according to the conveyance speed of the recording medium 214, so that printing in one line can be performed in the width direction of the recording medium 214.

Here, for example, nozzles on both sides of the nozzle 51-13 mean nozzles 51-12 and 51-14. That is, the non-ejection correction parameter of the nozzle 51-13 is applied to the nozzle 51-12 and the nozzle 51-14. As described above, the nozzles on the both sides in the present embodiment mean nozzles which deposit ink droplets at an adjacent position in the main scanning direction.

Meanwhile, printing in the sub scanning direction (corresponding to the second direction) is performed by repeatedly performing in the recording medium conveyance direction the printing in one line (a line composed of dots in one row or a line composed of dots in a plurality of rows) formed in the main scanning direction as described above while conveying the recording medium 214.

In the present embodiment, the arrangement form of the nozzles 51 on the head 50 is not limited to the example in the drawing. For example, the nozzles may be arranged linearly in one row, arranged in a V shape, or arranged in a broken line shape such as a zigzag shape (a W shape or the like) in which the arrangement in a V shape is repeated instead of the matrix arrangement shown in FIGS. 8A and 8B.

In the present embodiment, a method of jetting ink droplets by deforming the actuator represented by the piezo element (piezoelectric element) is employed. However, the method of ejecting ink is not particularly limited in carrying out the present invention. Various methods may be applied, such as a thermal-jet method in which ink is heated by a heat generator such as a heater to generate air bubbles, and ink droplets are jetted by the pressure, instead of the piezo-jet method.

[Description of a Control System]

Figure 12:
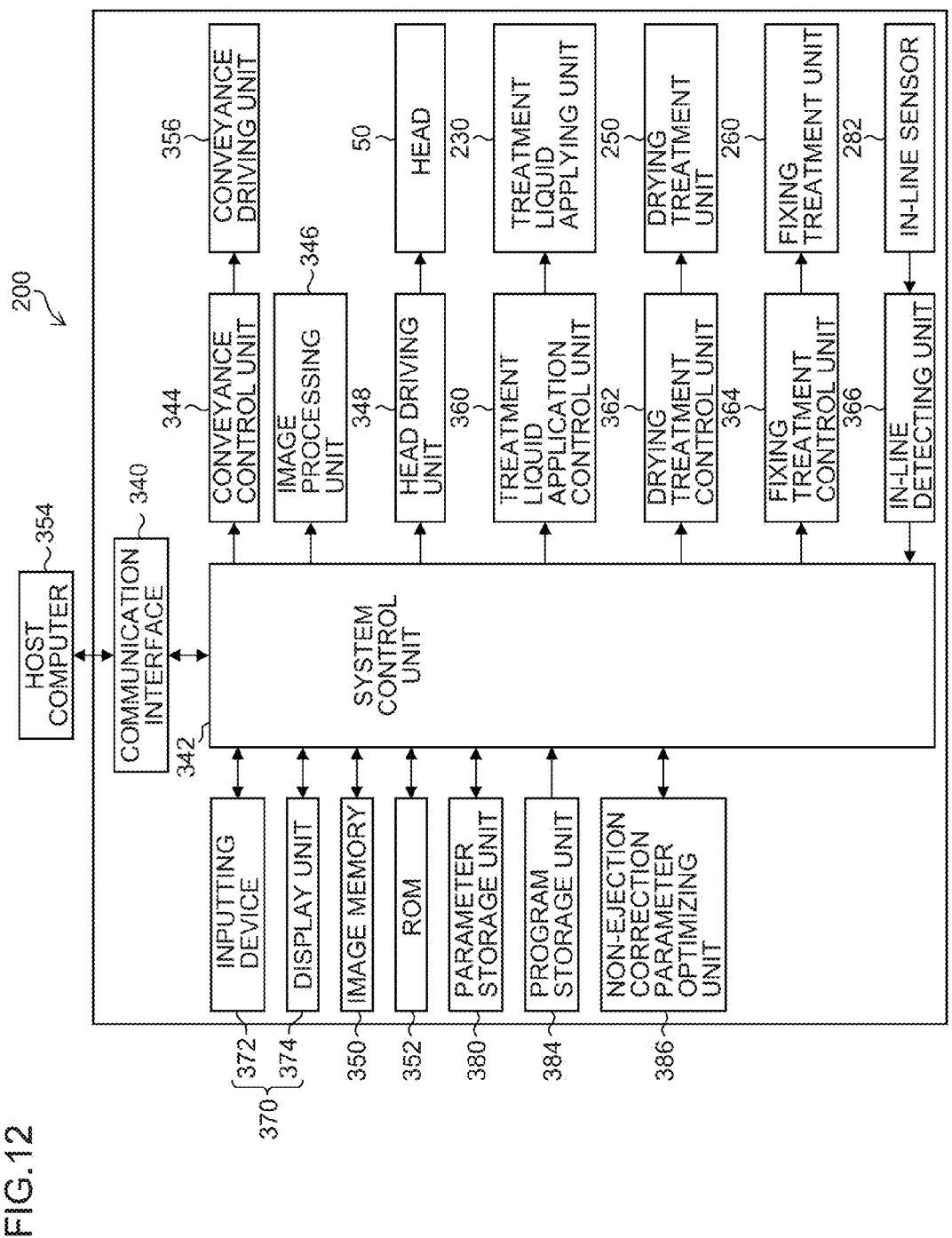
FIG. 12 is a block diagram illustrating the schematic configuration of a control system of the ink-jet recording apparatus.

FIG. 12 is a block diagram illustrating the schematic configuration of a control system of the ink-jet recording apparatus 200. The ink-jet recording apparatus 200 includes a communication interface 340, a system control unit 342, a conveyance control unit 344, an image processing unit 346, and a head driving unit 348, and also includes an in-line detecting unit 366, and a non-ejection correction parameter optimizing unit 386.

The communication interface 340 is an interface unit which receives image data sent from a host computer 354. A serial interface such as a USB (universal serial bus), or a parallel interface such as a centronics may be applied as the communication interface 340. The communication interface 340 may be also equipped with a buffer memory (not shown) for speeding up communications.

The system control unit 342 is composed of a central processing unit (CPU), peripheral circuits, or the like. The system control unit 342 functions as a controlling device which controls the entire ink-jet recording apparatus 200 according to a predetermined program, functions as an arithmetic device which performs various arithmetic operations, and further functions as a memory controller for an image memory 350 and a ROM 352. That is, the system control unit 342 controls the respective units such as the communication interface 340 and the conveyance control unit 344, controls communications with the host computer 354 and reading and writing of the image memory 350 and the ROM 352, and generates a control signal for controlling the above respective units.

The system control unit 342 also includes the control unit 150 shown in FIG. 2.

The image data fed from the host computer 354 is loaded into the ink-jet recording apparatus 200 via the communication interface 340, and subjected to predetermined image processing in the image processing unit 346.

The image processing unit 346 is a control unit which is provided with a signal (image) processing function to perform processing such as various manipulations and corrections for generating a printing controlling signal from the image data, and supplies the generated printing data to the head driving unit 348. The image processing unit 346 gives desired signal processing. The amount of ejected droplets (the amount of deposition) or the timing of ejection of the head 50 is controlled via the head driving unit 348 based on the image data. Accordingly, a desired dot size or dot arrangement is achieved. The head driving unit 348 shown in FIG. 12 may include a feedback control system which maintains constant conditions for driving the head 50.

The conveyance control unit 344 controls the conveyance timing and the conveyance speed of the recording medium 214 (see FIG. 7) based on the printing controlling signal generated by the image processing unit 346. A conveyance driving unit 356 shown in FIG. 12 includes a motor for rotating the impression cylinders 234 to 264 in FIG. 7, a motor for rotating the transfer cylinders 232 to 262, a motor of the feeding mechanism for the recording medium 214 in the paper feeding unit 220, and a motor for driving the tension roller 272A (272B) of the discharging unit 270. The conveyance control unit 344 functions as a controller for the above motors.

The image memory (primary storage memory) 350 has a function as a primary storage device which temporarily stores the image data input via the communication interface 340, and a function as an expansion area for various programs stored in the ROM 352 and an arithmetic work area for the CPU (e.g., a work area of the image processing unit 346). A volatile memory (RAM) capable of sequential reading and writing is used as the image memory 350.

The program executed by the CPU of the system control unit 342, and various data and control parameters required in controlling the respective units of the apparatus are stored in the ROM 352. The data is read and written via the system control unit 342. The ROM 352 is not limited to a memory composed of a semiconductor element, and a magnetic medium such as a hard disk may be also employed. Also, an external interface may be provided so as to use a removable storage medium.

The ink-jet recording apparatus 200 further includes a treatment liquid application control unit 360, a drying treatment control unit 362, and a fixing treatment control unit 364. The ink-jet recording apparatus 200 controls the operations of the respective units such as the treatment liquid applying unit 230, the drying treatment unit 250, and the fixing treatment unit 260 according to an instruction from the system control unit 342.

The treatment liquid application control unit 360 controls the timing of treatment liquid application and also controls the application amount of treatment liquid based on the printing data obtained from the image processing unit 346. The drying treatment control unit 362 controls the timing of drying treatment in the drying treatment device 256, and also controls the treatment temperature, the amount of air blowing or the like. The fixing treatment control unit 364 controls the temperature of the heater 266, and also controls the pressing of the fixing roller 268.

The in-line detecting unit 366 is a processing block including a signal processing unit which gives predetermined signal processing such as noise removal, amplification, and waveform shaping to the read signal output from the in-line sensor 282 shown in FIG. 7. The system control unit 342 determines whether or not the ejection from the head 50 is abnormal based on the detection signal obtained by the in-line detecting unit 366.

The ink-jet recording apparatus 200 described in the present embodiment includes a user interface 370, and the user interface 370 includes an inputting device 372 which allows an operator (user) to input various information, and a display unit (display) 374. Various forms such as a keyboard, a mouse, a touch panel, and a button may be employed as the inputting device 372. An operator can input printing conditions, select an image quality mode, input and edit accompanying information, and search information by operating the inputting device 372, and can also check various information such as an input content and a search result through display on the display unit 374. The display unit 374 also functions as a device for displaying warning such as an error message. The display unit 374 in FIG. 12 may be applied as a display as an alarming device in the control system shown in FIG. 7.

Various control parameters required in the operations of the ink-jet recording apparatus 200 are stored in a parameter storage unit 380. The system control unit 342 appropriately reads out a parameter required in the control, and, if necessary, updates (rewrites) the various parameters. The nozzle number of the non-ejection nozzle is also stored as non-ejection nozzle information.

A program storage unit 384 is a storage device in which the control program for operating the ink-jet recording apparatus 200 is stored.

The non-ejection correction parameter optimizing unit 386 includes the non-ejection correction parameter storage unit 152, the test chart data generating unit 154, the test chart data storage unit 156, the test chart read data storage unit 160, and the non-ejection correction parameter updating unit 164 shown in FIG. 2.

The test chart data generated in the non-ejection correction parameter optimizing unit 386 is input to the system control unit 342. The system control unit 342 drives the head 50 by the head driving unit 348, and records the test chart on the recording medium 214.

The test chart is read by the in-line sensor 282, subjected to the predetermined signal processing in the in-line detecting unit 366, and then input to the system control unit 342. The non-ejection correction parameter optimizing unit 386 evaluates the read data, and updates the non-ejection correction parameter.

[Operation of the Ink-Jet Recording Apparatus]

Figure 13:
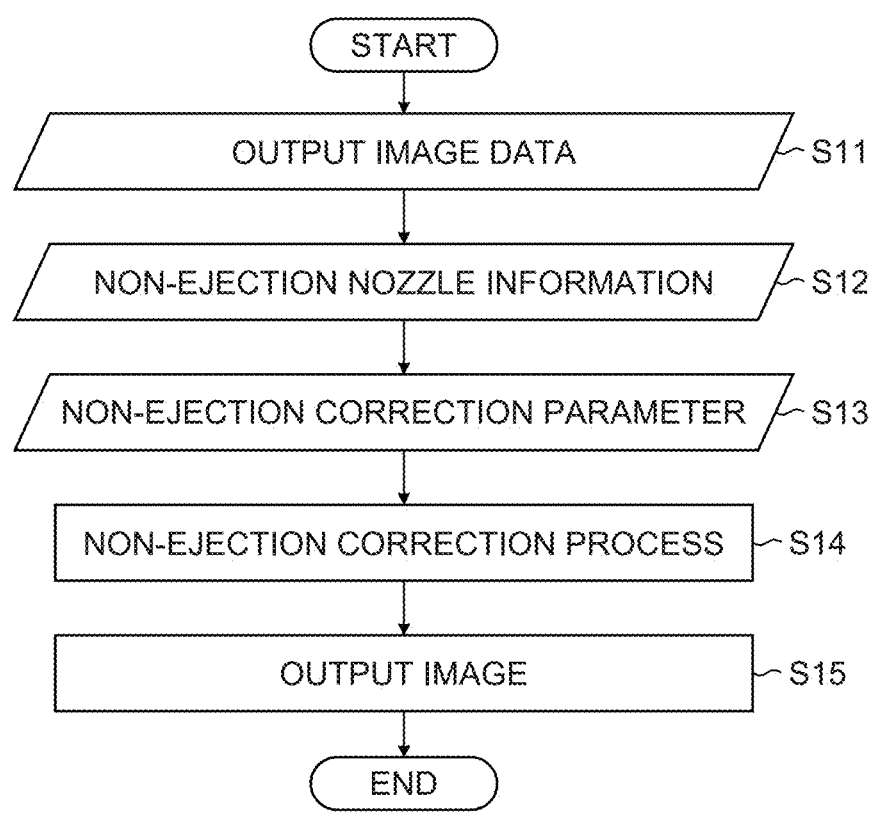
FIG. 13 is a flowchart illustrating an image recording operation of the ink-jet recording apparatus.

FIG. 13 is a flowchart illustrating an image recording operation of the ink-jet recording apparatus 200.

(Step S11: One Example of a Data Acquiring Step)

First, the system control unit 342 (one example of a data acquiring device) acquires the output image data. The output image data is acquired via the communication interface 340.

(Step S12: One Example of a Non-Ejection Nozzle Identifying Step)

Subsequently, the system control unit 342 (one example of a non-ejection nozzle identifying device) acquires the non-ejection nozzle information. As described above, the nozzles 51 are arranged in a matrix on the head 50. If there is a nozzle which does not eject ink, dots are not formed in a certain region, and a white stripe is generated in the output image.

The non-ejection nozzle information can be acquired by, for example, outputting a test chart for detecting non-ejection, and reading the output test chart. The non-ejection nozzle may be also detected by detecting whether or not ink is ejected from each nozzle by a sensor. The non-ejection nozzle information acquired as described above is stored in the parameter storage unit 380. Here, the system control unit 342 reads out the non-ejection nozzle information from the parameter storage unit 380.

(Step S13)

Subsequently, the system control unit 342 acquires the non-ejection correction parameter of the non-ejection nozzle. Here, the non-ejection correction parameters for all the nozzles obtained by the optimizing process shown in FIG. 4 are stored in the non-ejection correction parameter storage unit 152.

The non-ejection correction parameter storage unit 152 stores the non-ejection correction parameters with respect to each tone. The system control unit 342 acquires a tone corresponding to the non-ejection nozzle from the image data acquired in step S11, and acquires the non-ejection correction parameter in the tone.

(Step S14: One Example of a Non-Ejection Correcting Step)

The image processing unit 346 (one example of a non-ejection correcting device) acquires the non-ejection correction parameter of the non-ejection nozzle from the system control unit 342, performs the non-ejection correction of the image data acquired in step S11, and generates the printing controlling signal.

(Step S15: One Example of a Recording Controlling Step)

The head driving unit 348 controls the amount of ejected droplets and the timing of ejection of the head 50 based on the printing controlling signal, and records the output image on the recording surface of the recording medium 214.

The white stripe generated by the non-ejection nozzle can be appropriately corrected by performing the non-ejection correction of the non-ejection nozzle by use of the optimized non-ejection correction parameter, and recording the output image as described above.

The technical scope of the present invention is not limited to the scope of the aforementioned embodiments. The configurations or the like in the respective embodiments may be combined as appropriate between the respective embodiments without departing from the gist of the present invention.

What is claimed is:

1. An apparatus for optimizing a non-ejection correction parameter of an ink-jet head, comprising:
    a test chart data generating device which generates test chart data based on the non-ejection correction parameter for each of a plurality of nozzles provided on the ink-jet head;
    a read data acquiring device which acquires read data of a test chart recorded on a recording medium by ejecting ink from the plurality of nozzles based on the test chart data while relatively moving the ink-jet head and the recording medium;
    an evaluating device which evaluates a correction intensity of the non-ejection correction parameter for each of the nozzles based on the acquired read data;
    a parameter updating device which updates the non-ejection correction parameter for each of the nozzles based on a single variable root-finding algorithm using iteration method from the evaluated correction intensity;
    a controlling device which optimizes the non-ejection correction parameter for each of the nozzles by repeatedly executing the operations of the test chart data generating device, the read data acquiring device, the evaluating device, and the parameter updating device; and
    an outputting device which outputs the optimized non-ejection correction parameter for each of the nozzles;
    wherein Brent's method is employed as the single variable root-finding algorithm using iteration method.

2. The apparatus for optimizing a non-ejection correction parameter of an ink-jet head according to claim 1, wherein the controlling device repeatedly executes the operations up to a predetermined number of times.

3. The apparatus for optimizing a non-ejection correction parameter of an ink-jet head according to claim 1, further comprising a determining device which determines whether or not the evaluated correction intensity is smaller than a predetermined value,
    wherein the controlling device repeatedly executes the operations until the evaluated correction intensity is determined to be smaller than the predetermined value.

4. The apparatus for optimizing a non-ejection correction parameter of an ink-jet head according to claim 1, wherein the test chart has a simulated non-ejection region formed by a first nozzle, a non-ejection correction region formed by second nozzles on both sides of the first nozzle, and a constant-density region formed by a third nozzle other than the first nozzle and the second nozzles, a plurality of stages in each of which the simulated non-ejection regions are arranged at a predetermined interval in a first direction being arranged in a second direction perpendicular to the first direction, and the simulated non-ejection regions in the plurality of stages being arranged at different positions from each other with respect to the first direction, and
    the test chart data is data which does not cause the first nozzle to eject ink, causes the third nozzle to eject ink at an instruction value of a predetermined density, and causes the second nozzles to eject ink at an instruction value obtained by correcting the instruction value of the predetermined density based on the non-ejection correction parameter of the first nozzle adjacent thereto.

5. The apparatus for optimizing a non-ejection correction parameter of an ink-jet head according to claim 4, wherein the test chart further includes a reference region stage obtained by causing all the nozzles to eject ink at the instruction value of the predetermined density.

6. The apparatus for optimizing a non-ejection correction parameter of an ink-jet head according to claim 4, wherein the correction intensity is a difference between a density value of the read data around the simulated non-ejection region and a density value of the predetermined density.

7. The apparatus for optimizing a non-ejection correction parameter of an ink-jet head according to claim 4, wherein the non-ejection correction parameter for each of the nozzles is provided with respect to each density, and the controlling device optimizes the non-ejection correction parameter at the instruction value of the predetermined density.

8. The apparatus for optimizing a non-ejection correction parameter of an ink-jet head according to claim 1, wherein the non-ejection correction parameter for each of the nozzles is composed of a plurality of parameters expressed with a common variable, and the parameter updating device updates the common variable.

9. An ink-jet printer comprising:

an ink-jet head which is provided with a plurality of nozzles for ejecting ink; and an apparatus for optimizing a non-ejection correction parameter of the ink-jet head, wherein the apparatus for optimizing a non-ejection correction parameter is the apparatus defined in claim 1.

* * * * *